(12) United States Patent
Sato et al.

(10) Patent No.: US 10,471,949 B2
(45) Date of Patent: Nov. 12, 2019

(54) AUTOMOBILE EQUIPPED WITH THREE-PHASE MOTOR

(71) Applicants: Toyota Jidosha Kabushiki Kaisha, Toyota-shi, Aichi-ken (JP); Aisin AW Co., Ltd., Anjo-shi, Aichi-ken (JP)

(72) Inventors: Ryoji Sato, Toyohashi (JP); Masayuki Baba, Toyota (JP); Shogo Tanaka, Anjo (JP); Takuya Shimaji, Anjo (JP)

(73) Assignees: Toyota Jidosha Kabushiki Kaisha, Toyota-shi, Aichi-ken (JP); Aisin AW Co., Ltd., Anjo-shi, Aichi-ken (JP)

( * ) Notice: Subject to any disclaimer, the term of this patent is extended or adjusted under 35 U.S.C. 154(b) by 142 days.

(21) Appl. No.: 15/461,068

(22) Filed: Mar. 16, 2017

(65) Prior Publication Data
US 2017/0274894 A1    Sep. 28, 2017

(30) Foreign Application Priority Data

Mar. 22, 2016 (JP) .................. 2016-057009

(51) Int. Cl.
*B60W 20/30*   (2016.01)
*B60W 10/08*   (2006.01)
(Continued)

(52) U.S. Cl.
CPC ............ *B60W 20/30* (2013.01); *B60K 6/26* (2013.01); *B60K 6/365* (2013.01); *B60K 6/46* (2013.01); *B60K 6/547* (2013.01); *B60L 50/16* (2019.02); *B60L 50/51* (2019.02); *B60L 50/61* (2019.02); *B60W 10/08* (2013.01); *B60W 10/115* (2013.01); *B60W 10/26* (2013.01); *B60K 6/28* (2013.01); *B60L 2210/42* (2013.01); *B60L 2220/14* (2013.01); *B60L 2240/421* (2013.01); *B60L 2260/46* (2013.01); *B60W 2510/083* (2013.01); *B60W 2510/107* (2013.01); *B60W 2510/1025* (2013.01);
(Continued)

(58) Field of Classification Search
None
See application file for complete search history.

(56) References Cited

U.S. PATENT DOCUMENTS

2006/0012328 A1   1/2006  Yasukawa et al.
2006/0113949 A1*  6/2006  Nishimura ............. H02K 19/36
                                                    318/723
(Continued)

FOREIGN PATENT DOCUMENTS

JP    H05-296335 A    11/1993
JP    2006033993 A     2/2006
(Continued)

*Primary Examiner* — Thomas G Black
*Assistant Examiner* — Demetra R Smith-Stewart
(74) *Attorney, Agent, or Firm* — Dinsmore & Shohl LLP

(57) ABSTRACT

With a motor in rotation, 0 is set as each of a d-axis current command and a q-axis current command, and offset learning is carried out. Then, in carrying out offset learning, a transmission is controlled such that a shift stage of the transmission falls within a low vehicle speed-side predetermined shift stage range. Thus, the rotational speed of the motor can be more reliably made high to a certain extent, and offset learning can be carried out. As a result, the accuracy of offset learning can be restrained from decreasing.

7 Claims, 14 Drawing Sheets

(51) Int. Cl.
  *B60W 10/26* (2006.01)
  *B60W 10/115* (2012.01)
  *B60K 6/365* (2007.10)
  *B60K 6/547* (2007.10)
  *B60K 6/26* (2007.10)
  *B60K 6/46* (2007.10)
  *B60L 50/61* (2019.01)
  *B60L 50/16* (2019.01)
  *B60L 50/51* (2019.01)
  *B60K 6/28* (2007.10)

(52) U.S. Cl.
  CPC . *B60W 2510/242* (2013.01); *B60W 2710/083* (2013.01); *B60W 2710/105* (2013.01); *B60W 2710/1072* (2013.01); *B60W 2710/242* (2013.01); *Y02T 10/6217* (2013.01); *Y02T 10/642* (2013.01); *Y02T 10/7005* (2013.01); *Y02T 10/7077* (2013.01); *Y02T 10/7241* (2013.01); *Y02T 10/7258* (2013.01)

(56) References Cited

U.S. PATENT DOCUMENTS

| | | | |
|---|---|---|---|
| 2008/0058159 A1* | 3/2008 | Watanabe | F16H 61/0213 477/156 |
| 2010/0195693 A1* | 8/2010 | Kitajima | F16H 61/12 374/1 |
| 2011/0316458 A1* | 12/2011 | Yanagita | H02P 21/06 318/400.02 |
| 2013/0106325 A1 | 5/2013 | Savio et al. | |
| 2015/0160639 A1* | 6/2015 | Yoshida | G05B 19/048 318/635 |
| 2015/0214875 A1* | 7/2015 | Matsui | H02P 6/15 318/400.13 |
| 2016/0076639 A1 | 3/2016 | Uchida et al. | |
| 2017/0111000 A1* | 4/2017 | Saito | H02P 29/60 |

FOREIGN PATENT DOCUMENTS

| | | |
|---|---|---|
| JP | 2011-240903 A | 12/2011 |
| JP | 2013528344 A | 7/2013 |

* cited by examiner

|  | C1 | C2 | B1 | B2 |
|---|---|---|---|---|
| 1st | ○ | – | – | ○ |
| 2nd | ○ | – | ○ | – |
| 3rd | ○ | ○ | – | – |
| 4th | – | ○ | ○ | – |
| R. | ○ | – | – | ○ |
| N.P | – | – | – | – |

※ "○": ENGAGEMENT  "–": RELEASE

WITH NO OFFSET ERROR ($\Delta\theta = 0$, Id2=0, Iq2=0)

WITH OFFSET ERROR ($\Delta\theta \neq 0$, Id2=0, Iq2=0)

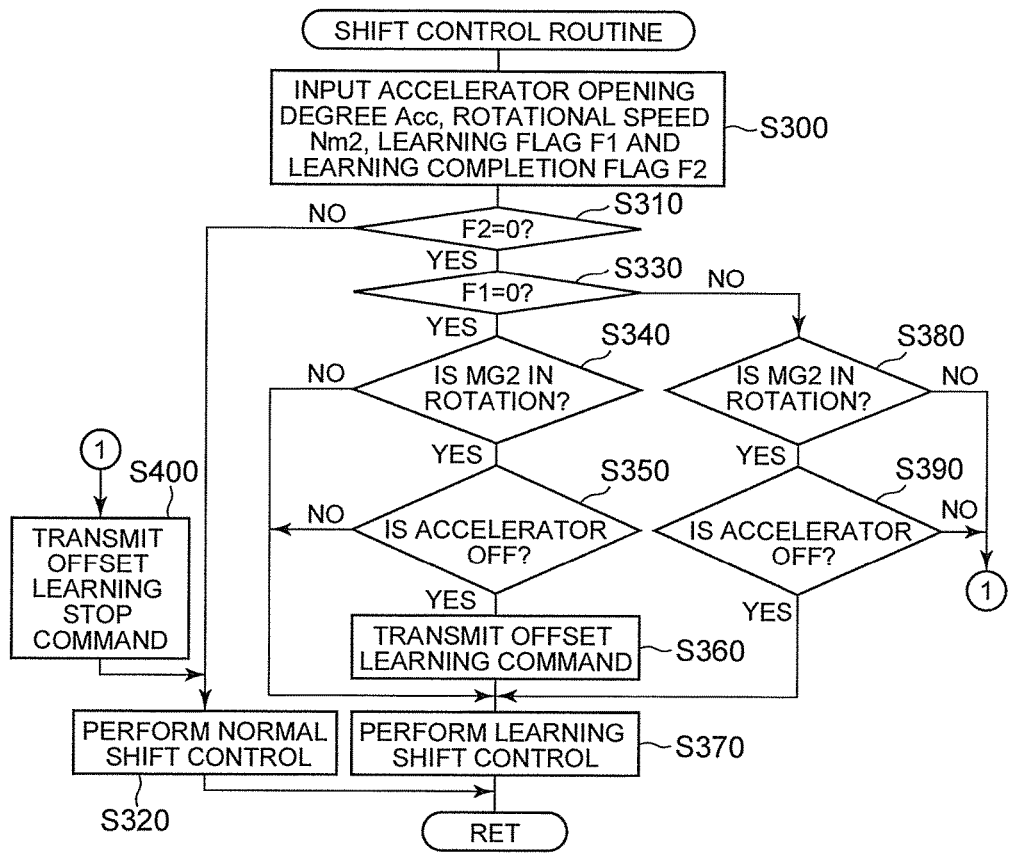
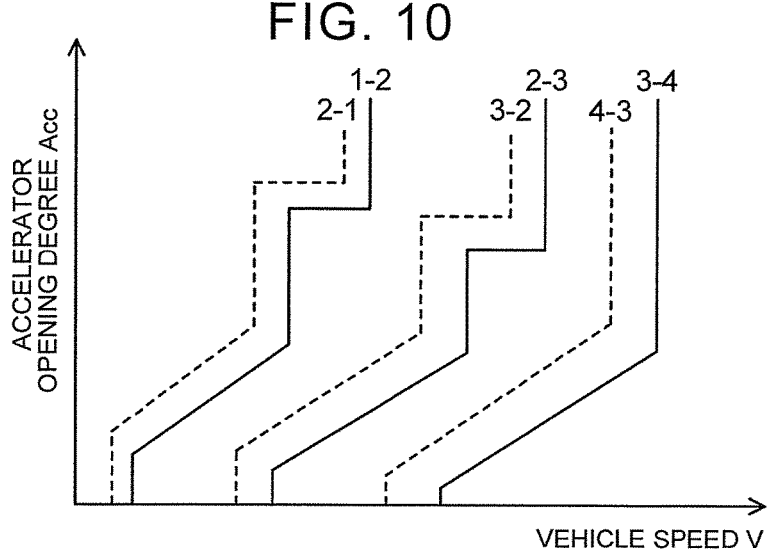

AUTOMOBILE EQUIPPED WITH THREE-PHASE MOTOR

CROSS-REFERENCE TO RELATED APPLICATIONS

This application claims priority to Japanese Patent Application No. 2016-057009 filed on Mar. 22, 2016, the entire contents of which are hereby incorporated by reference.

BACKGROUND

1. Technical Field

The present disclosure relates to an automobile that is equipped with a three-phase motor and an inverter.

2. Description of Related Art

Conventionally, it has been proposed to learn an offset amount of a rotational position sensor that is attached to a rotor of a three-phase motor in the case where the three-phase motor is drivingly controlled based on a d-axis current and a q-axis current (e.g., see Japanese Patent Application Publication No. 2006-33993 (JP 2006-33993 A). The three-phase motor is drivingly controlled as follows. First of all, a d-axis current command and a q-axis current command are set based on a torque command of the three-phase motor. Subsequently, respective phase currents flowing through respective phases of the three-phase motor are detected by current sensors, and the respective phase currents are converted into a d-axis current and a q-axis current (three-to-two phase conversion) based on a rotational position of the three-phase motor from a rotational position sensor. Then, a d-axis voltage command and a q-axis voltage command are set based on the d-axis current command, the d-axis current, the q-axis current command and the q-axis current, and the d-axis voltage command and the q-axis voltage command are converted into respective phase voltage commands (two-to-three phase conversion) based on the rotational position of the three-phase motor from the rotational position sensor. Then, the three-phase motor is drivingly controlled by generating a PWM signal based on the respective phase voltage commands and performing switching control of an inverter. It should be noted herein that when the rotational position that is detected by the rotational position sensor includes an offset error, three-to-two phase conversion or two-to-three phase conversion is not adequately carried out, and a torque corresponding to a torque command cannot be output from the three-phase motor. Therefore, offset learning for learning an offset amount for subjecting the rotational position detected by the rotational position sensor to an offset correction is carried out. If the d-axis current command and the q-axis current command are made equal to 0 while the three-phase motor is in rotation, the d-axis voltage command is also equal to 0 in the case where the rotational position sensor does not include an offset error. However, in the case where the rotational position sensor includes an offset error, even when the d-axis current command and the q-axis current command are made equal to 0 while the three-phase motor is in rotation, the d-axis voltage command does not become equal to 0. Therefore, offset learning is carried out by adjusting the offset amount of the rotational position such that the d-axis voltage command becomes equal to 0 when the d-axis current command and the q-axis current command are made equal to 0.

SUMMARY

However, in the case where an offset error is included (the offset amount is not an adequate value) in carrying out offset learning of the rotational position sensor, the d-axis voltage command is higher when the angular velocity (the rotational speed) of the motor is high than when the angular velocity (the rotational speed) of the motor is low if the d-axis current command and the q-axis current command are made equal to 0. Accordingly, when the rotational speed of the motor is low, the d-axis voltage command is low, namely, the error has a great influence, and the accuracy of offset learning is low. That is, a low-accuracy learning result may be reflected.

Thus, the present disclosure provides an automobile that restrains the accuracy of offset learning of a rotational position sensor from decreasing.

According to one aspect of the present disclosure, there is provided an automobile that is equipped with a three-phase motor, an inverter, a transmission, a rotational position sensor, and an electronic control unit. The inverter is configured to drive the three-phase motor. The transmission is configured to transmit motive power while changing a shift stage between a rotary shaft of the three-phase motor and a drive shaft that is coupled to an axle of the automobile. The rotational position sensor is configured to detect a rotational position of the three-phase motor. The electronic control unit is configured as follows. That is, the electronic control unit is configured to: (i) set a d-axis current command and a q-axis current command based on a torque command of the three-phase motor, (ii) convert respective phase currents of the three-phase motor into a d-axis current and a q-axis current based on the rotational position of the three-phase motor, (iii) set a d-axis voltage command and a q-axis voltage command based on the d-axis current command, the d-axis current, the q-axis current command and the q-axis current, (iv) convert the d-axis voltage command and the q-axis voltage command into respective phase voltage commands of the three-phase motor based on the rotational position of the three-phase motor, (v) control the inverter based on the respective phase voltage commands, (vi) learn an offset amount of the rotational position sensor, (vii) correct the rotational position detected by the rotational position sensor based on a learned offset amount, (viii) carry out offset learning that makes the d-axis current command and the q-axis current command equal to 0 with the three-phase motor in rotation, and learns the offset amount of the rotational position such that the d-axis voltage command based on the d-axis current command and the q-axis current command becomes equal to 0, and (ix) carry out learning shift control that controls the transmission such that the shift stage of the transmission falls within a low vehicle speed-side predetermined shift stage range, in carrying out the offset learning.

According to the automobile as described above, the d-axis current command and the q-axis current command are made equal to 0 with the three-phase motor in rotation, and offset learning for learning the offset amount of the rotational position such that the d-axis voltage command based on the d-axis current command and the q-axis current command, which have been made equal to 0, becomes equal to 0 is carried out. Then, in carrying out offset learning, learning shift control for controlling the transmission such that the shift stage of the transmission falls within the low vehicle speed-side predetermined shift stage range is performed. As described hitherto, offset learning can be carried out with the angular velocity (the rotational speed) of the three-phase motor more reliably made high to a certain extent, by performing learning shift control in carrying out offset learning. As a result, the accuracy of offset learning can be restrained from decreasing. That is, a low-accuracy learning result can be restrained from being reflected. It should be noted herein that "the low vehicle speed-side predetermined shift stage range" means a range from the lowest speed stage to a shift stage somewhat lower than the highest speed stage. For example, the low vehicle speed-side predetermined shift stage range means a range from the first speed stage to the second speed stage in a four-stage transmission, a range from the first speed stage to any one of the second speed stage, the third speed stage and the fourth speed stage in a six-stage transmission, a range from the first speed stage to any one of the second speed stage, the third speed stage, the fourth speed stage and the fifth speed stage in an eight-stage transmission, or the like. Besides, "learning shift control" may be performed only in carrying out offset learning. Alternatively, "learning shift control" may be performed until offset learning is completed, when offset learning has not been completed yet.

Besides, in the automobile, the electronic control unit may be configured to control the transmission such that the shift stage of the transmission is held equal to a predetermined shift stage within the predetermined shift stage range, in carrying out the learning shift control. In this manner, the rotational speed of the motor can be kept from rapidly changing due to a change in the shift stage of the transmission in carrying out offset learning. As a result, the accuracy of offset learning can be kept from decreasing.

Besides, in the automobile, the predetermined shift stage may be a highest speed stage within the predetermined shift stage range. In this manner, in the case where a deceleration requirement is made smaller (made closer to 0 while remaining negative) when the shift stage of the transmission is high (the high vehicle speed-side shift stage) than when the shift stage of the transmission is low with the accelerator off during running (while the motor is in rotation) and offset learning is carried out with the accelerator off during running, the difference between the torque command of the motor based on the deceleration requirement and the output torque of the motor in carrying out offset learning (the torque at the time when the d-axis current command and the q-axis current command are made equal to 0) can be made small. As a result, a driver can be restrained from developing a feeling of strangeness in carrying out offset learning.

Besides, in the automobile, the electronic control unit may be configured to stop the learning shift control and to carry out predetermined failsafe shift control when an abnormality occurs in the transmission or a temperature of the transmission becomes equal to or higher than a predetermined temperature, in carrying out the learning shift control. In this manner, the degree of abnormality or overheat of the transmission can be restrained from increasing in the case where "the predetermined temperature" is an upper limit of a temperature range where the transmission normally operates.

Besides, in the automobile, the electronic control unit may be configured to stop the offset learning when an abnormality occurs in the transmission or a temperature of the transmission becomes equal to or higher than a predetermined temperature, in carrying out the offset learning. In this manner, the accuracy of offset learning can be kept from decreasing.

Besides, in the automobile, the electronic control unit may be configured to stop the offset learning when a rotational speed of the three-phase motor falls outside a predetermined rotational speed range, in carrying out the offset learning. In this manner, the accuracy of offset learning can be kept from decreasing in the case where "the predetermined rotational speed range" is a rotational speed range of the three-phase motor where offset learning can be carried out with suffi-ciently high accuracy in carrying out learning shift control. Besides, in the case where the upper limit of "the predetermined rotational speed range" is an upper limit of a rotational speed range of the motor where the inverter is controlled through pulse width modulation control (in the case where the inverter is controlled through rectangular wave control when the rotational speed of the motor is higher than the predetermined rotational speed range), offset learning can be kept from being carried out in a region of rectangular wave control, and the controllability of the motor can be kept from decreasing. Furthermore, in the case where the upper limit of "the predetermined rotational speed range" is a rotational speed slightly lower than an upper-limit rotational speed at which the driver does not feel a shift shock even when the shift stage is changed immediately after ending learning shift control upon the completion of offset learning, the driver can be restrained from feeling a shift shock after the completion of offset learning.

Still further, in the automobile, the electronic control unit may be configured to (i) end the learning shift control when a present shift stage coincides with a normal shift stage based on an accelerator operation amount and a vehicle speed of the automobile, after the offset learning is completed in carrying out the learning shift control, and (ii) carry out normal shift control that controls the transmission such that the shift stage of the transmission becomes the normal shift stage, after ending the learning shift control. In this manner, the driver can be kept from developing a feeling of strangeness due to a change in the shift stage of the transmission immediately after the completion of offset learning.

BRIEF DESCRIPTION OF THE DRAWINGS

Features, advantages, and technical and industrial significance of an exemplary embodiment of the present disclosure will be described below with reference to the accompanying drawings, in which like numerals denote like elements, and wherein:

FIG. 9 is a flowchart showing an exemplary shift control routine that is executed by an HVECU shown in FIG. 1;

FIG. 10 is an illustrative view showing an exemplary shift map of the transmission;

DETAILED DESCRIPTION OF EMBODIMENT

Next, a mode for carrying out the present disclosure will be described using an embodiment thereof.

Figure 1:
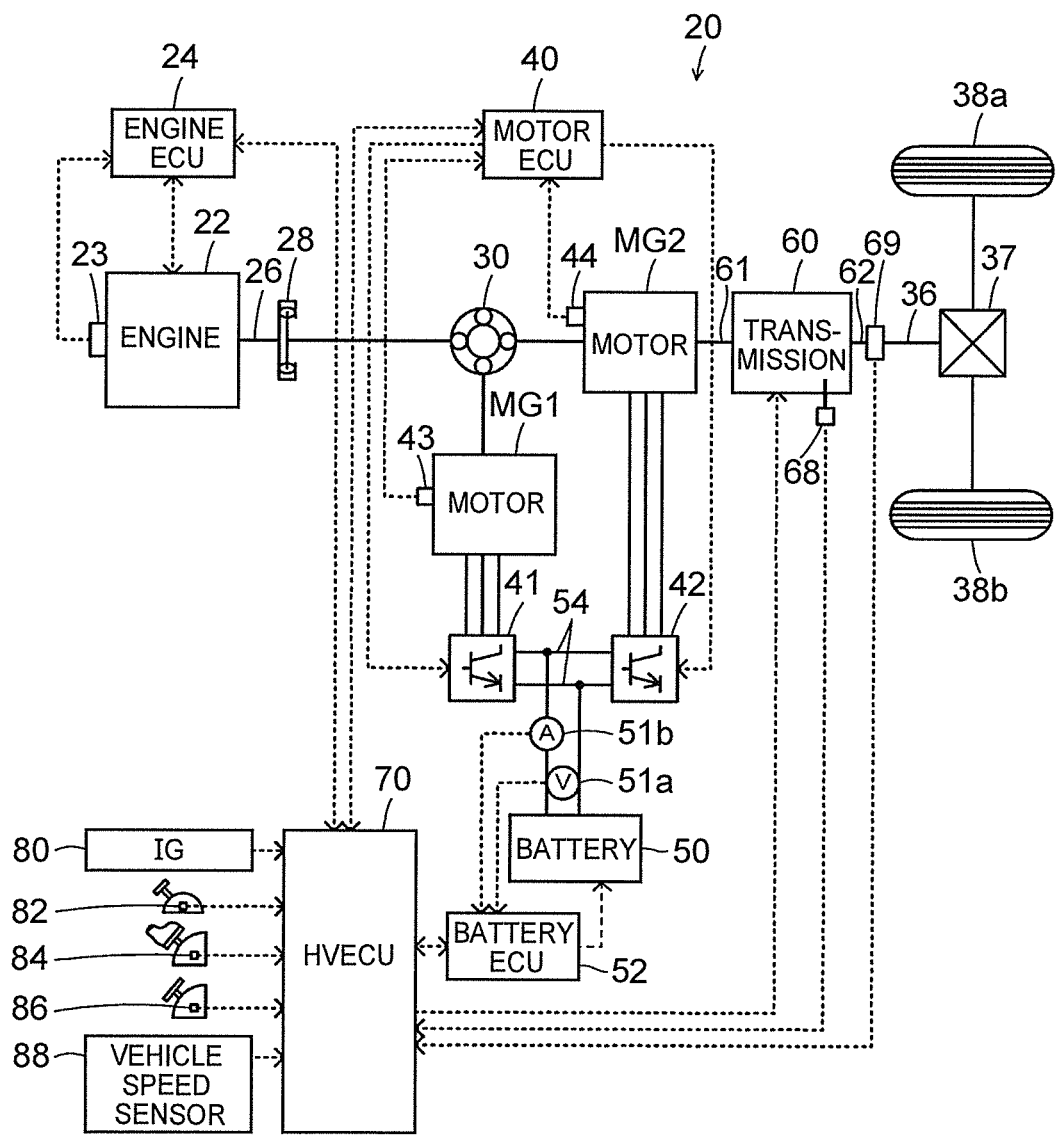
FIG. 1 is a block diagram showing the outline of the configuration of a hybrid automobile as the embodiment of the present disclosure.
Figure 2:
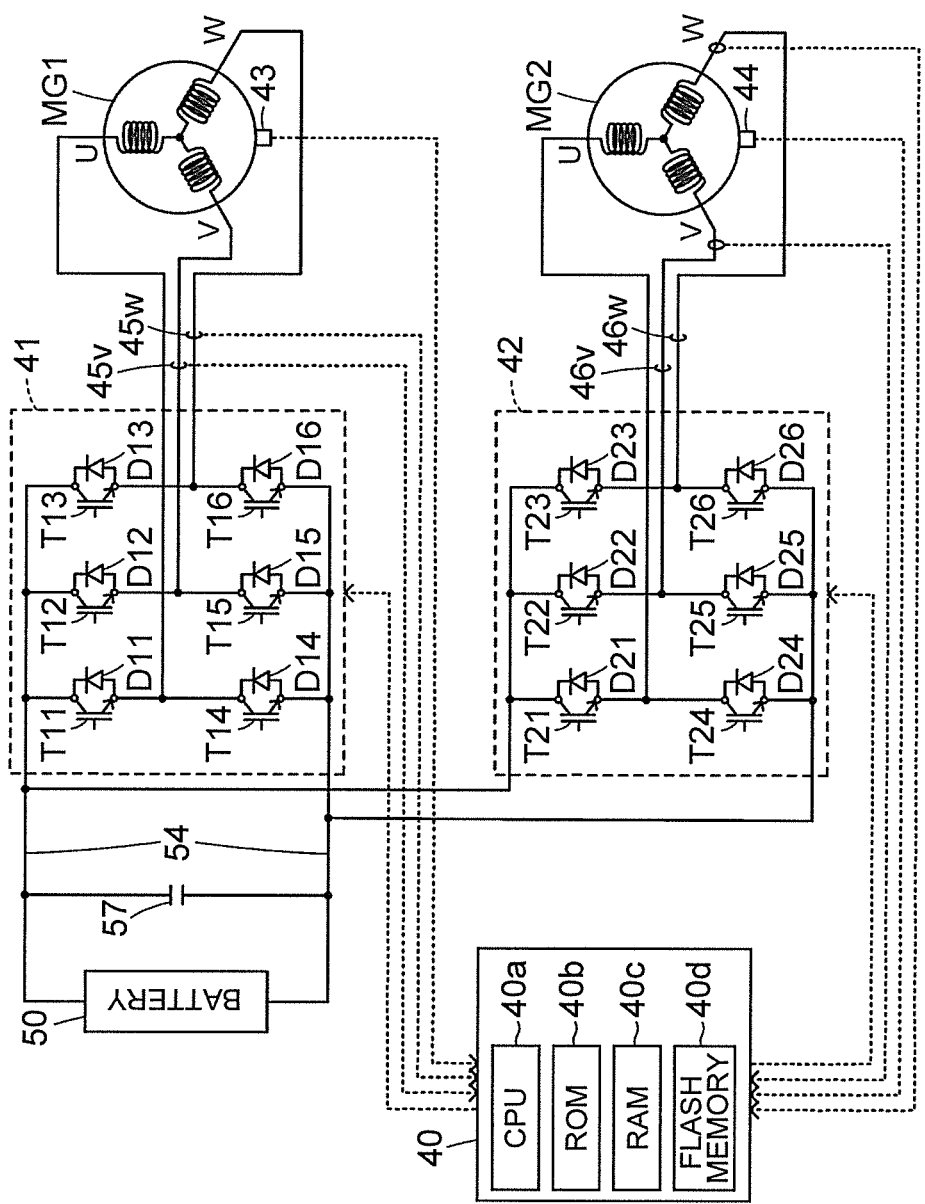
FIG. 2 is a block diagram showing the outline of the configuration of an electric drive system including a first motor and a second motor shown in FIG. 1.
Figure 3:
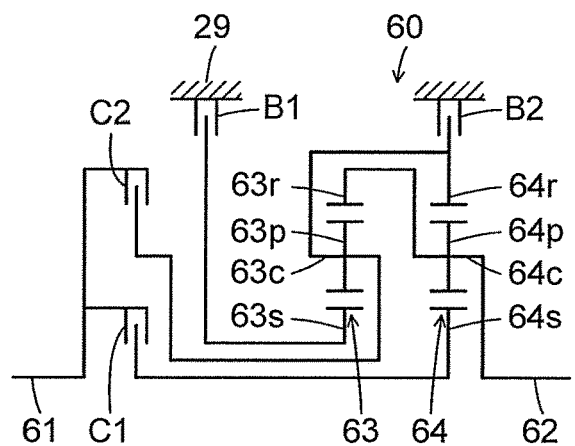
FIG. 3 is a block diagram showing the outline of the configuration of a transmission shown in FIG. 1.

FIG. 1 is a block diagram showing the outline of the configuration of a hybrid automobile 20 as the embodiment of the present disclosure. FIG. 2 is a block diagram showing the outline of the configuration of an electric drive system including a first motor MG1 and a second motor MG2. FIG. 3 is a block diagram showing the outline of the configuration of a transmission 60.

As shown in the drawings, the hybrid automobile 20 according to the embodiment of the present disclosure is equipped with an engine 22, a planetary gear set 30, the first motor MG1, the second motor MG2, a first inverter 41, a second inverter 42, the transmission 60, a battery 50, and a hybrid electronic control unit (hereinafter referred to as "an HVECU") 70.

The engine 22 is configured as an internal combustion engine that outputs motive power using gasoline, light oil or the like as fuel. The operation of this engine 22 is controlled by an engine electronic control unit (hereinafter referred to as "an engine ECU") 24.

The engine ECU 24 is configured as a microprocessor that is mainly constituted of a CPU. In addition to the CPU, the engine ECU 24 is equipped with a ROM that stores a processing program, a RAM that temporarily stores data, input/output ports, and a communication port. Signals from various sensors that are needed to control the operation of the engine 22, for example, a crank angle θcr from a crank position sensor 23 and the like are input to the engine ECU 24 via the input ports respectively. Various control signals for controlling the operation of the engine 22 are output from the engine ECU 24 via the output ports respectively. The engine ECU 24 is connected to the HVECU 70 via the communication port. The engine ECU 24 computes a rotational speed Ne of the engine 22 based on the crank angle θcr from the crank position sensor.

The planetary gear set 30 is configured as a single pinion-type planetary gear set. A rotor of the first motor MG1 is connected to a sun gear of the planetary gear set 30. An input shaft 61 of the transmission 60 is connected to a ring gear of the planetary gear set 30. A crankshaft 26 of the engine 22 is connected to a carrier of the planetary gear set 30 via a damper 28.

The first motor MG1 is configured as a synchronous generator motor having a rotor in which a permanent magnet is embedded, and a stator around which a three-phase coil is wound. As described above, the rotor of this first motor MG1 is connected to the sun gear of the planetary gear set 30. The second motor MG2 is configured as a synchronous generator motor that is similar to the first motor MG1. The rotor of this second motor MG2 is connected to the input shaft 61 of the transmission 60.

The first inverter 41 is connected to an electric power line 54. As shown in FIG. 2, this first inverter 41 is equipped with six transistors T11 to T16 as six switching elements, and six diodes D11 to D16. The transistors T11 to T16 are arranged in pairs in such a manner as to be located on a source side and a sink side with respect to a positive electrode line and a negative electrode line of the electric power line 54. The six diodes D11 to D16 are connected in parallel to the transistors T11 to T16 respectively in a reverse direction. Each of three-phase coils (U-, V- and W-phases) of the first motor MG1 is connected to a connecting point of corresponding pairs of the transistors T11 to T16. Accordingly, when a voltage is applied to the first inverter 41, the ratio of the on-time of the pairs of the transistors T11 to T16 is adjusted by a motor electronic control unit (hereinafter referred to as "a motor ECU") 40. Thus, a rotating magnetic field is formed in the three-phase coils, and the first motor MG1 is rotationally driven.

As is the case with the first inverter 41, the second inverter 42 is equipped with six transistors T21 to T26 and six diodes D21 to D26. Then, when a voltage is applied to the second inverter 42, the ratio of the on-time of pairs of the transistors T21 to T26 is adjusted by the motor ECU 40. Thus, a rotating magnetic field is formed in three-phase coils, and the second motor MG2 is rotationally driven.

The motor ECU 40 is configured as a microprocessor that is mainly constituted of a CPU 40a. In addition to the CPU 40a, the motor ECU 40 is equipped with a ROM 40b that stores a processing program, a RAM 40c that temporarily stores data, a flash memory 40d, input/output ports, and a communication port. Signals from various sensors that are needed to drivingly control the first motor MG1 and the second motor MG2 are input to the motor ECU 40 via the input ports respectively. These signals are, for example, rotational positions θm1 and θm2, phase currents Iv1, Iw1, Iv2 and Iw2, and the like. The rotational positions θm1 and θm2 are input from rotational position sensors 43 and 44 that detect rotational positions of rotors of the first motor MG1 and the second motor MG2 respectively. The phase currents Iv1, Iw1, Iv2 and Iw2 are input from current sensors 45v, 45w, 46v and 46w that detect currents flowing through respective phases (V-phases and W-phases) of the first motor MG1 and the second motor MG2 respectively. Switching control signals to the transistors T11 to T16 and T21 to T26 of the first inverter 41 and the second inverter 42 and the like are output from the motor ECU 40 via the output ports respectively. The motor ECU 40 is connected to the HVECU 70 via the communication port. The motor ECU 40 computes angular velocities ωm1 and ωm2 and rotational speeds Nm1 and Nm2 of the first motor MG1 and the second motor MG2 based on the rotational positions θm1 and θm2 of the rotors of the first motor MG1 and the second motor MG2 from the rotational position sensors 43 and 44, respectively.

The transmission 60 is configured as a four-stage transmission. As shown in FIGS. 1 and 3, the transmission 60 is equipped with the input shaft 61, an output shaft 62, two single pinion-type planetary gear sets 63 and 64, and two clutches C1 and C2 and two brakes B1 and B2 as a plurality of hydraulically driven engagement elements. The input shaft 61 is connected to the ring gear of the planetary gear set 30 and the rotor (a rotary shaft) of the second motor MG2. The output shaft 62 is connected to a drive shaft 36 that is coupled to driving wheels 38*a* and 38*b* via a differential gear set 37.

The planetary gear set 63 has a sun gear 63*s* as an external gear, a ring gear 63*r* as an internal gear that is arranged concentrically with the sun gear 63*s*, a plurality of pinions 63*p* that mesh with the sun gear 63*s* and the ring gear 63*r* respectively, and a carrier 63*c* that retains the plurality of the pinions 63*p* such that the plurality of the pinions 63*p* can rotate around their own axes and around the carrier 63*c*.

The planetary gear set 64 has a sun gear 64*s* as an external gear, a ring gear 64*r* as an internal gear that is arranged concentrically with the sun gear 64*s*, a plurality of pinions 64*p* that mesh with the sun gear 64*s* and the ring gear 64*r* respectively, and a carrier 64*c* that retains the plurality of the pinions 64*p* such that the plurality of the pinions 64*p* can rotate around their own axes and around the carrier 64*c*.

The carrier 63*c* of the planetary gear set 63 and the ring gear 64*r* of the planetary gear set 64 are coupled (fixed) to each other. The ring gear 63*r* of the planetary gear set 63 and the carrier 64*c* of the planetary gear set 64 are coupled to each other. Accordingly, the planetary gear set 63 and the planetary gear set 64 function as so-called four element-type mechanisms in which the sun gear 63*s* of the planetary gear set 63, the carrier 63*c* of the planetary gear set 63, the ring gear 64*r* of the planetary gear set 64, the ring gear 63*r* of the planetary gear set 63, the carrier 64*c* of the planetary gear set 64, and the sun gear 64*s* of the planetary gear set 64 are used as four rotary elements. Besides, the ring gear 63*r* of the planetary gear set 63 and the carrier 64*c* of the planetary gear set 64 are coupled to the drive shaft 36 (an output shaft of the transmission 60).

The clutch C1 connects/disconnects the input shaft 61 and the sun gear 64*s* of the planetary gear set 64 to/from each other. The clutch C2 connects/disconnects the input shaft 61 and the carrier 63*c* of the planetary gear set 63 to/from each other, and connects/disconnects the input shaft 61 and the ring gear 64*r* of the planetary gear set 64 to/from each other. The brake B1 unrotatably fixes (connects) the sun gear 63*s* of the planetary gear set 63 to a transmission case 29 as a stationary member, and rotatably releases this sun gear 63*s* from the transmission case 29. The brake B2 unrotatably fixes (connects) the carrier 63*c* of the planetary gear set 63 and the ring gear 64*r* of the planetary gear set 64 to the transmission case 29, and rotatably releases this carrier 63*c* and this ring gear 64*r* from the transmission case 29. Hydraulic oil is supplied/discharged to/from the clutches C1 and C2 and the brakes B1 and B2 by an oil pressure control device (not shown), and the clutches C1 and C2 and the brakes B1 and B2 thereby operate.

Figure 4:
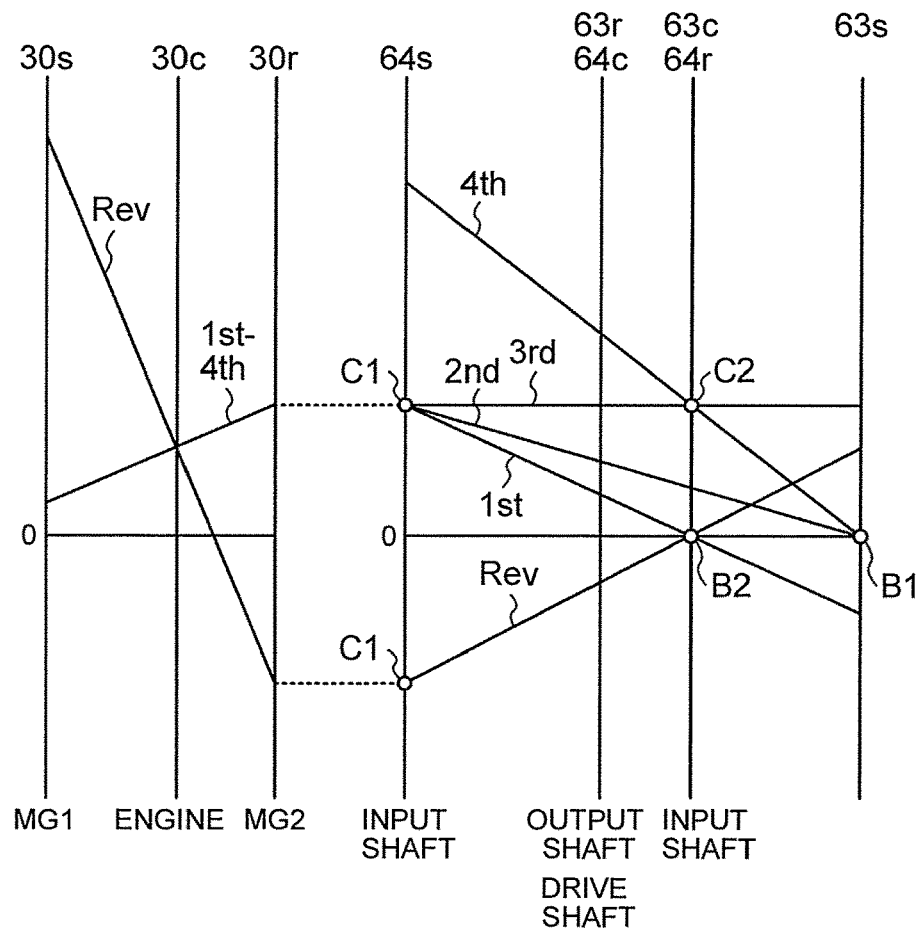
FIG. 4 is an illustrative view showing an exemplary alignment chart showing a relationship among rotational speeds of respective rotary elements of a planetary gear set and the transmission shown in FIG. 1.
Figures 5, 6:
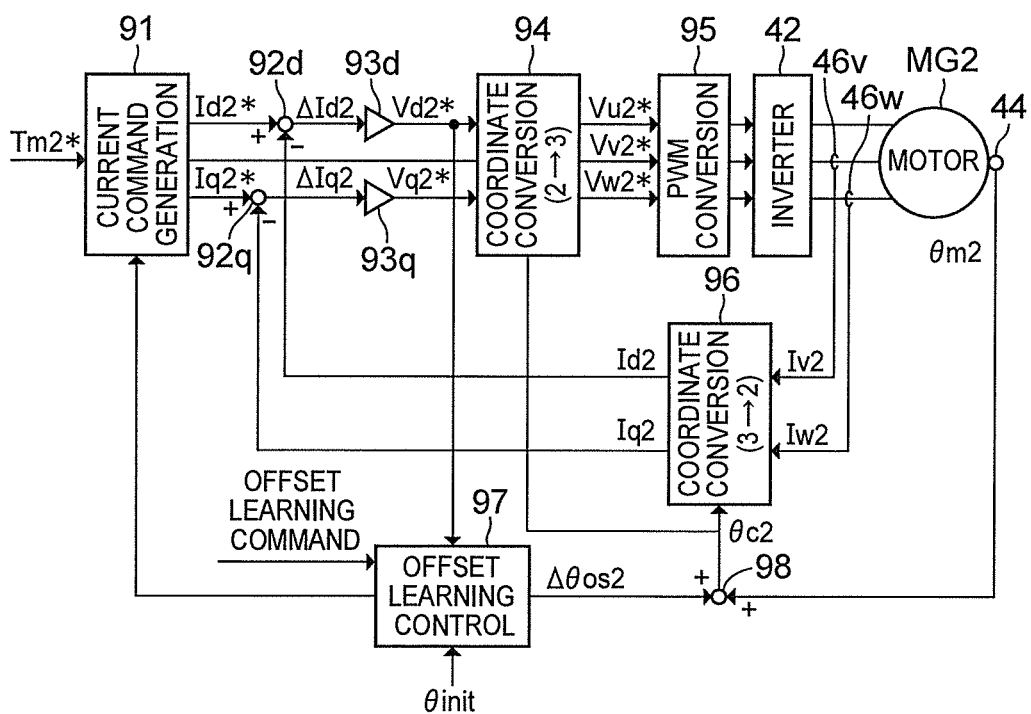
FIG. 5 is an operation chart showing a relationship between respective shift stages of the transmission and operation states of a first clutch, a second clutch, a first brake and a second brake.
FIG. 6 is a control block diagram for drivingly controlling the second motor.

FIG. 4 is an illustrative view showing an exemplary alignment chart showing a relationship among rotational speeds of the respective rotary elements of the planetary gear set 30 and the transmission 60. FIG. 5 is an operation chart showing a relationship between respective shift stages of the transmission 60 and operation states of the clutches C1 and C2 and the brakes B1 and B2. When a shift position SP is a running position (a drive position or a reverse position), the transmission 60 forms forward stages, namely, first to fourth speed stages and a backward stage as follows. By engaging the clutch C1 and the brake B2 and releasing the clutch C2 and the brake B1, the transmission 60 forms the first speed stage and the backward stage. By engaging the clutch C1 and the brake B1 and releasing the clutch C2 and the brake B2, the transmission 60 forms the second speed stage. By engaging the clutch C1 and the clutch C2 and releasing the brakes B1 and B2, the transmission 60 forms the third speed stage. By engaging the clutch C2 and the brake B1 and releasing the clutch C1 and the brake B2, the transmission 60 forms the fourth speed stage. Besides, when the shift position SP is a non-running position (a neutral position or a parking position), the transmission 60 disconnects the input shaft 61 and the output shaft 62 (the drive shaft 36) from each other (cancels the transmission of motive power between the input shaft 61 and the output shaft 62) by releasing all the clutches C1 and C2 and all the brakes B1 and B2.

The battery 50 is configured as, for example, a lithium-ion secondary battery or a nickel hydride secondary battery, and is connected to the first inverter 41 and the second inverter 42 via the electric power line 54. This battery 50 is managed by a battery electronic control unit (hereinafter referred to as "a battery ECU") 52.

Although not shown in the drawing, the battery ECU 52 is configured as a microprocessor that is mainly constituted of a CPU. In addition to the CPU, the battery ECU 52 is equipped with a ROM that stores a processing program, a RAM that temporarily stores data, input/output ports, and a communication port. Signals from various sensors that are needed to manage the battery 50, for example, a voltage Vb from a voltage sensor 51*a* that is mounted between terminals of the battery 50, a current Ib from a current sensor 51*b* that is attached to the output terminal of the battery 50, and the like are input to the battery ECU 52 via the input ports respectively. The battery ECU 52 is connected to the HVECU 70 via the communication port. The battery ECU 52 computes a state of charge SOC based on an integrated value of the current Ib of the battery 50 from the current sensor 51*b*. The state of charge SOC is the ratio of a capacity of electric power that can be discharged from the battery 50 to a total capacity of the battery 50.

Although not shown in the drawing, the HVECU 70 is configured as a microprocessor that is mainly constituted of a CPU. In addition to the CPU, the HVECU 70 is equipped with a ROM that stores a processing program, a RAM that temporarily stores data, input/output ports, and communication ports. Signals from various sensors are input to the HVECU 70 via the input ports respectively. As the signals that are input to the HVECU 70, for example, a temperature Toil from a temperature sensor 68 that detects a temperature of cooling oil for cooling the transmission 60 (ATF: automatic transmission fluid), a rotational speed Np of the drive shaft 36 from a rotational speed sensor 69 that is attached to the drive shaft 36 (the output shaft 62 of the transmission 60), an ignition signal from an ignition switch 80, the shift position SP from a shift position sensor 82 and the like can be mentioned. Besides, an accelerator opening degree Acc from an accelerator pedal position sensor 84, a brake pedal position BP from a brake pedal position sensor 86, a vehicle speed V from a vehicle speed sensor 88, and the like can also be mentioned. A control signal to the transmission 60 and the like are output from the HVECU 70 via the output ports respectively. As described above, the HVECU 70 is connected to the engine ECU 24, the motor ECU 40 and the battery ECU 52 via the communication ports respectively.

Incidentally, in the hybrid automobile 20 according to the embodiment of the present disclosure, a parking position (a P position) that is used in parking the automobile, a reverse position (an R position) for backward running, a neutral position (an N position), a drive position (a D position) for forward running, and the like are available as the shift position SP.

In the hybrid automobile 20 thus configured according to the embodiment of the present disclosure, the engine 22, the first motor MG1, the second motor MG2 (hereinafter referred to as "a hybrid portion") and the transmission 60 are controlled such that the hybrid automobile 20 runs in a hybrid running (HV running) mode or an electric running (EV running) mode. It should be noted herein that the HV running mode is a mode in which the hybrid automobile 20 runs with the engine 22 in operation, and that the EV running mode is a mode in which the hybrid automobile 20 runs with the engine 22 out of operation. The control of the hybrid portion in the EV running mode and the control of the hybrid portion in the HV running mode will be described hereinafter. Incidentally, the control of the transmission 60 will be described later.

The control of the hybrid portion in the EV running mode will be described. First of all, the HVECU 70 sets a required torque Tout* of the drive shaft 36 based on the accelerator opening degree Acc and the vehicle speed V. In the embodiment of the present disclosure, in the case where the accelerator is on, the required torque Tout* is set without taking a shift stage Gs of the transmission 60 into account. In the case where the accelerator is off, the required torque Tout* is set such that a deceleration requirement becomes smaller (becomes closer to 0 while remaining negative) when the shift stage Gs of the transmission 60 is high (a high vehicle speed-side shift stage) than when the shift stage Gs of the transmission 60 is low. Subsequently, a gear ratio Gr of the transmission 60 is calculated by dividing the rotational speed Nm2 of the second motor MG2 (the rotational speed of the input shaft 61 of the transmission 60) by a rotational speed Nout of the drive shaft 36, and a required torque Tin* that is required of the input shaft 61 of the transmission 60 is calculated by dividing the required torque Tout* of the drive shaft 36 by the gear ratio Gr of the transmission 60. Then, 0 is set as a torque command Tm1* of the first motor MG1, the required torque Tin* of the input shaft 61 of the transmission 60 is set as a torque command Tm2* of the second motor MG2, and the set torque commands Tm1* and Tm2* of the first motor MG1 and the second motor MG2 are transmitted to the motor ECU 40. The motor ECU 40 performs switching control of the transistors T11 to T16 and T21 to T26 of the first inverter 41 and the second inverter 42 such that the first motor MG1 and the second motor MG2 are driven according to the torque commands Tm1* and Tm2* respectively.

The control of the hybrid portion in the HV running mode will be described. First of all, in the same manner as described above, the HVECU 70 sets the required torque Tout* of the drive shaft 36 (the output shaft 62 of the transmission 60), the gear ratio Gr of the transmission 60, and the required torque Tin* of the input shaft 61 of the transmission 60. Subsequently, a required power Pin* that is input to the input shaft 61 of the transmission 60 is calculated by multiplying the required torque Tin* of the input shaft 61 of the transmission 60 by the rotational speed Nm2 of the second motor MG2 (the rotational speed of the input shaft 61 of the transmission 60), and a required power Pe* that is required of the engine 22 is calculated by subtracting a charge/discharge required power Pb* of the battery 50 (which is positive when electric power is discharged from the battery 50) from the calculated required power Pin*. Then, a target rotational speed Ne* and a target torque Te* of the engine 22 are set through the use of the required power Pe* and an operation line of the engine 22 (e.g., a fuel consumption operation line). Subsequently, the torque command Tm1* of the first motor MG1 is set through rotational speed feedback control for making the rotational speed Ne of the engine 22 equal to the target rotational speed Ne*. Then, the torque command Tm2* of the second motor MG2 is calculated by subtracting a torque that is output from the first motor MG1 when the first motor MG1 is driven according to the torque command Tm1* and that is applied to the drive shaft 36 via the planetary gear set 30, from the required torque Tin* of the input shaft 61 of the transmission 60. Then, the target rotational speed Ne* and the target torque Te* of the engine 22 are transmitted to the engine ECU 24, and the torque commands Tm1* and Tm2* of the first motor MG1 and the second motor MG2 are transmitted to the motor ECU 40. The engine ECU 24 performs intake air amount control, fuel injection control, ignition control and the like of the engine 22 such that the engine 22 is operated based on the target rotational speed Ne* and the target torque Te*.

Next, drive control of the second motor MG2 (the transistors T21 to T26 of the second inverter 42) will be described. Drive control of the second motor MG2 is performed by control blocks of FIG. 6 that are included in the motor ECU 40. As shown in FIG. 6, in drive control of the second motor MG2, a d-axis current command Id2* and a q-axis current command Iq2* in a dq-axis coordinate system are first generated based on the torque command Tm2* by a current command generator 91. The current command generator 91 generates the d-axis current command Id2* and the q-axis current command Iq2* by applying the torque command Tm2* to a current command table that determines in advance how the torque command Tm2* is related to the d-axis current command Id2* and the q-axis current command Iq2*. Subsequently, on the assumption that the sum of currents flowing through the U-phase, the V-phase and the W-phase of the second motor MG2 is equal to 0, a V-phase current Iv2 and a W-phase current Iw2 from the current sensors 46v and 46w are converted into the d-axis current Id2 and the q-axis current Iq2 (three-to-two phase conversion) through the use of a control rotational position θc2 of the second motor MG2, by a coordinate converter 96. The control rotational position θc2 of the second motor MG2 is used after being computed by an adder 98 as the sum of a rotational position θm2 that is detected by the rotational position sensor 44 and an offset amount Δθos2 that is output by a later-described offset learning control unit 97. Subsequently, a difference ΔId2 between the d-axis current command Id2* and a d-axis current Id2 for current feedback and a difference ΔIq2 between the q-axis current command Iq2* and a q-axis current Iq2 for current feedback are computed by subtractors 92d and 92q respectively. Then, a d-axis voltage command Vd2* and a q-axis voltage command Vq2* are generated based on the computed differences ΔId2 and ΔIq2 by voltage command converters 93d and 93q respectively. It should be noted herein that each of the d-axis voltage command Vd2* and the q-axis voltage command Vq2* is computed as the sum of a feedback term based on a corresponding one of the differences ΔId2 and ΔIq2 and a feedforward term for cancelling a term that interferes with the other axis (the second term on the right side of each of later-described expressions (1) and (2)). When the d-axis voltage command Vd2* and the q-axis voltage command Vq2* are generated, the d-axis voltage command Vd2* and the q-axis voltage command Vq2* are converted into respective phase voltage commands Vu2*, Vv2* and Vw2* (two-to-three phase conversion) through the use of the control rotational position θc2 of the above-mentioned second motor MG2, by a coordinate converter 94. Then, a pulse width modulation signal (a PWM signal) is generated based on the respective phase voltage commands Vu2*, Vv2* and Vw2* by a PWM converter 95. The transistors T21 to T26 of the second inverter 42 are switched based on the generated PWM signal, so a DC electric power is applied to the second motor MG2 as a three-phase AC electric power. Incidentally, the first motor MG1 can also be drivingly controlled through the use of control blocks similar to those of FIG. 6.

A case where the rotational position θm2 that is detected by the rotational position sensor 44 is directly used as the control rotational position θc2 of the second motor MG2 that is used in coordinate conversion (three-to-two phase conversion and two-to-three phase conversion) will now be considered. Given that the d-axis is a direction of a magnetic flux that is generated by a permanent magnet and that the q-axis is an axis that is perpendicular to the d-axis, a voltage equation of the second motor MG2 can be expressed by the following expressions (1) and (2). In the expressions (1) and (2), "Vd2" and "Vq2" denote a d-axis voltage and a q-axis voltage respectively, "R2" denotes a resistance value per phase, "Id2" and "Iq2" denote a d-axis current and a q-axis current respectively, "ωm2" denotes an angular velocity of the rotor, and "φd2" and "φq2" denote a d-axis magnetic flux and a q-axis magnetic flux respectively.

$$Vd2 = R2 \times Id2 - \omega m2 \times \phi q2 \quad (1)$$

$$Vq2 = R2 \times Iq2 + \omega m2 \times \phi d2 \quad (2)$$

Figure 7A:
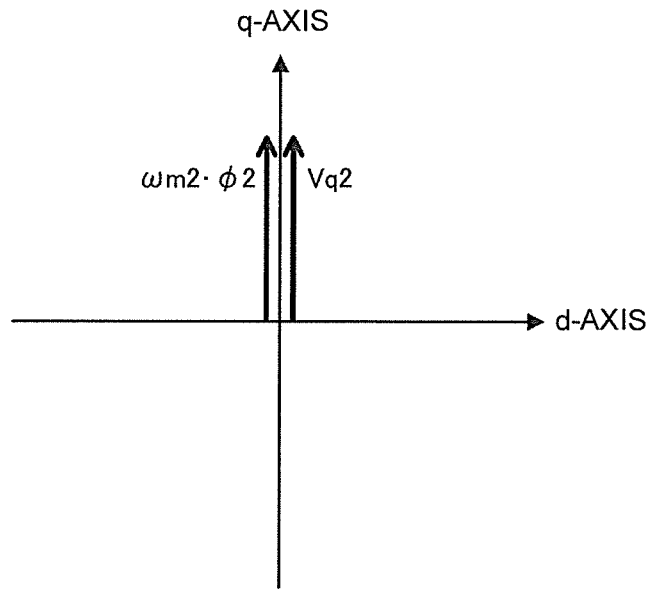
FIG. 7A is an illustrative view showing a d-axis voltage and a q-axis voltage in the case where a rotational position sensor shown in FIG. 1 does not include an offset error.

When there is no phase difference Δθ (no offset error) between the rotational position θm2 of the second motor MG2 that is detected by the rotational position sensor 44 and the actual rotational position of the second motor MG2, the direction of a magnetic flux φ2 that is generated by the permanent magnet coincides with the d-axis (see FIG. 7A). Therefore, the d-axis magnetic flux φd2 and the q-axis magnetic flux φq2 can be expressed by expressions (3) and (4) shown below respectively. In the expressions (3) and (4), "Ld2" and "Lq2" denote a d-axis inductance and a q-axis inductance respectively.

$$\phi d2 = Ld2 \times Id2 + \phi 2 \quad (3)$$

$$\phi q2 = Lq2 \times Iq2 \quad (4)$$

In this case, given that the d-axis current Id2 and the q-axis current Iq2 are equal to 0, it turns out from the expressions (3) and (4) that the d-axis magnetic flux φd2 and the q-axis magnetic flux φq are equal to φ2 and 0 respectively. Then, when these values are assigned to the expressions (1) and (2) respectively, the d-axis voltage Vd2 and the q-axis voltage Vq2 are expressed by expressions (5) and (6) shown below respectively, and the d-axis voltage Vd2 is equal to 0.

$$Vd2 = 0 \quad (5)$$

$$Vq2 = \omega m2 \times \phi 2 \quad (6)$$

Figure 7B:
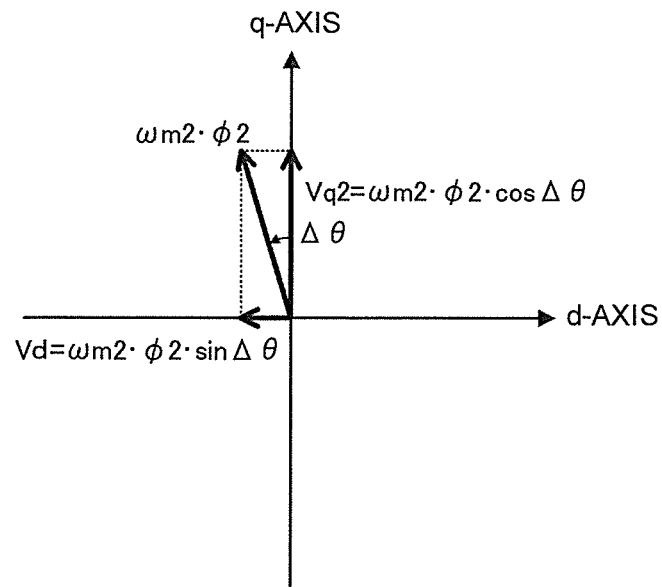
FIG. 7B is an illustrative view showing the d-axis voltage and the q-axis voltage in the case where the rotational position sensor shown in FIG. 1 includes an offset error.

On the other hand, when there is a phase difference Δθ (an offset error) between the rotational position θm of the second motor MG2 that is detected by the rotational position sensor 44 and the actual rotational position of the second motor MG2, a deviation of the phase difference Δθ occurs between the direction of the magnetic flux φ2 that is generated by the permanent magnet and the d-axis (see FIG. 7B). Therefore, given that the d-axis current Id2 and the q-axis current Iq2 are equal to 0, the d-axis voltage Vd2 and the q-axis voltage Vq2 are expressed by expressions (7) and (8) shown below respectively. When the second motor MG2 is in rotation (when the angular velocity ωm2 is not equal to 0), the d-axis voltage Vd2 is not equal to 0.

$$Vd2 = \omega m2 \times \phi 2 \times \sin \Delta \theta \quad (7)$$

$$Vq2 = \omega m2 \times \phi 2 \times \cos \Delta \theta \quad (8)$$

As described hitherto, in the case where the rotational position θm2 that is detected by the rotational position sensor 44 does not have an offset error, when the d-axis current Id2 and the q-axis current Iq2 are made equal to 0, the d-axis voltage Vd2 is equal to 0. On the other hand, in the case where the rotational position θm2 that is detected by the rotational position sensor 44 has an offset error, even when the d-axis current Id2 and the q-axis current Iq2 are made equal to 0, the d-axis voltage Vd2 is not equal to 0 as long as the second motor MG2 is in rotation. As described above, the rotational position θm2 that is detected by the rotational position sensor 44 is used for coordinate conversion (two-to-three phase conversion and three-to-two phase conversion) by the coordinate converters 94 and 96. Therefore, if an offset correction for counterbalancing an offset error is not made when the rotational position θm2 has this offset error, coordinate conversion cannot be appropriately carried out, and a torque matching the torque command Tm2* cannot be output from the second motor MG2. In the embodiment of the present disclosure, offset learning is carried out. That is, the d-axis current Id2 and the q-axis current Iq2 are made equal to 0 while the second motor MG2 is in rotation. In this state, the rotational position θm2 that is detected by the rotational position sensor 44 is offset such that the d-axis voltage Vd2 becomes equal to 0. The offset amount Δθos2 of the rotational position θm at the time when the d-axis voltage Vd2 becomes equal to 0 is adopted as a later-described learning offset amount Δθlv2 as a learning value (an offset error). When offset learning is carried out, the rotational position θm2 that is detected by the rotational position sensor 44 is offset by the offset amount Δθos2 by the adder 98, and is output to each of the coordinate converters 94 and 96 as the control rotational position θc2.

Figure 8:
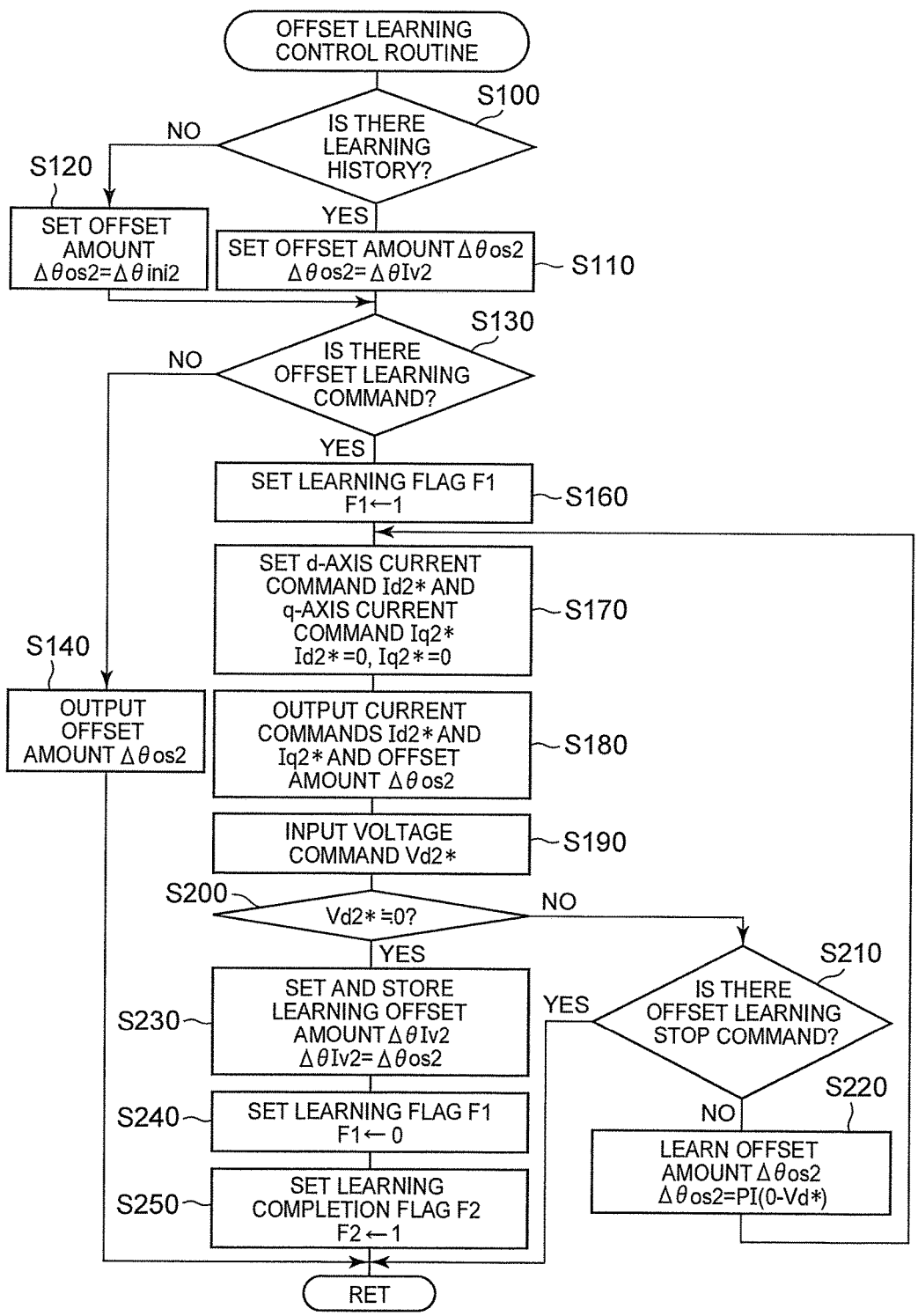
FIG. 8 is a flowchart showing an exemplary offset learning control routine that is executed by a motor ECU shown in FIG. 1.

Next, the operation of the hybrid automobile 20 thus configured according to the embodiment of the present disclosure will be described. In particular, the operation in carrying out offset learning of the rotational position sensor 44 and the operation of the transmission 60 will be described. FIG. 8 is a flowchart showing an exemplary offset learning control routine that is executed by the offset learning control unit 97 of the motor ECU 40, and FIG. 9 is a flowchart showing an exemplary shift control routine that is executed by the HVECU 70. These routines will be sequentially described hereinafter.

The offset learning control routine of FIG. 8 will be described. This routine is repeatedly executed at intervals of a predetermined time (e.g., at intervals of several milliseconds). When the offset learning control routine is executed, the offset learning control unit 97 of the motor ECU 40 first determines whether or not an offset learning history is stored in the flash memory 40d (step S100). Then, if it is determined that the offset learning history is stored, the learning offset amount Δθlv2 that is stored in the flash memory 40d is set as the offset amount Δθos2 (step S110). On the other hand, if it is determined that the offset learning history is not stored, an initial offset amount Δθini2 is set as the offset amount Δθos2 (step S120).

It should be noted herein that the initial offset amount Δθini2 is a learning value obtained through offset learning that is carried out when the hybrid automobile is shipped from a factory or a part thereof is replaced. Incidentally, when the part is replaced, an operator proceeds with an operation according to a predetermined procedure while the vehicle is held in a maintenance mode, and offset learning is thereby carried out. Thus, the offset learning history that is stored in the flash memory 40d is reset, and a new learning value is stored into the flash memory 40d as the initial offset amount Δθini2. It should be noted, however, that an appropriate value may not be stored as the initial offset amount Δθini2 after replacement of the part if offset learning is not carried out due to a mistake or the like of the operator. In consideration of this, according to the embodiment of the present disclosure, offset learning is carried out with a predetermined frequency, so the more appropriate learning offset amount Δθlv2 is stored into the flash memory 40d.

Subsequently, it is determined whether or not an offset learning command has been received from the HVECU 70 (step S130). Then, if it is determined that no offset learning command has been received, the offset amount Δθos2 set in step S110 or step S120 is output to the adder 98 (step S140), and the offset learning control routine is ended.

If it is determined in step S130 that an offset learning command has been received from the HVECU 70, a learning flag F1 is changed over from 0 to 1 (step S160). This learning flag F1 is a flag indicating whether or not offset learning is being carried out, and is reset (initialized) when offset learning is completed.

Subsequently, 0 is set as each of the d-axis current command Id2* and the q-axis current command Iq2* (step S170). Then, the set d-axis current command Id2* and the set q-axis current command Iq2* are output to the current command generator 91, and the offset amount Δθos2 set in step S110 or step S120 is output to the adder 98 (step S180).

When the d-axis current command Id2* and the q-axis current command Iq2*, which are equal to 0, are input to the current command generator 91, the current command generator 91 outputs the d-axis current command Id2* and the q-axis current command Iq2*, which are equal to 0, to the subtractors 92d and 92q respectively. Besides, when the offset amount Δθos2 is input to the adder 98, the adder 98 causes the rotational position θm2 detected by the rotational position sensor 44 to be input thereto, and outputs a value obtained by adding the offset amount Δθos2 to the rotational position θm2 to the coordinate converters 94 and 96 as the control rotational position θc2. When the d-axis current command Id2* and the q-axis current command Iq2* are input to the subtractors 92d and 92q from the coordinate converter 96 respectively, the subtractors 92d and 92q cause the d-axis current Id2 and the q-axis current Iq2 to be input thereto from the coordinate converter 96, compute differences ΔId2 and ΔIq2 between the d-axis current command Id2* and the d-axis current and between the q-axis current command Iq2* and the q-axis current, and output the differences ΔId2 and ΔIq2 to the voltage command converters 93d and 93q respectively. When the differences ΔId2 and ΔIq2 are input to the voltage command converters 93d and 93q respectively, the voltage command converters 93d and 93q generate the d-axis voltage command Vd2* and the q-axis voltage command Vq2* based on the differences ΔId2 and ΔIq2 respectively. As described above, in the case where the d-axis current command Id2* and the q-axis current command Iq2* are made equal to 0 while the second motor MG2 is in rotation, the d-axis voltage command Vd2* is equal to 0 when there is no deviation between the control rotational position θc2 and the actual rotational position, and the d-axis voltage command Vd2* is not equal to 0 when there is a deviation between the control rotational position θc2 and the actual rotational position.

Subsequently, the d-axis voltage command Vd2* is input from the voltage command converter 93d (step S190), and it is determined whether or not the input d-axis voltage command Vd2* is within a predetermined voltage range including 0 (step S200). It should be noted herein that the predetermined voltage range is determined in advance as a range where it may be determined that the present offset amount Δθos2 is an adequate value.

If it is determined in step S200 that the d-axis voltage command Vd2* is within the predetermined voltage range, it is determined that the present offset amount Δθos2 is an adequate value, the present offset amount Δθos2 is updated as the learning offset amount Δθlv2, this learning offset amount Δθlv2 is stored into the flash memory 40d (step S230), the learning flag F1 is changed over from 1 to 0 (step S240), a learning completion flag F2 is changed over from 0 to 1 (step S250), and the present routine is ended. It should be noted herein that the learning completion flag F2 is a flag indicating whether or not offset learning of the rotational position sensor 44 has been completed, and is reset to 0 (initialized) when the system is turned on (the system is activated) or when the system is turned off (the system is stopped). Therefore, offset learning is carried out once in a period from the turning on of the system to the turning off of the system (in a so-called single trip).

If it is determined in step S200 that the d-axis voltage command Vd2* is not within the predetermined voltage range, it is determined that the present offset amount Δθos2 is not an adequate value, and it is determined whether or not an offset learning stop command has been received from the HVECU 70 (step S210).

If it is determined in step S210 that no offset learning stop command has been received from the HVECU 70, the offset amount Δθos2 is calculated according to an expression (9) shown below through the use of the d-axis voltage command Vd2* (step S220), and a return to step S170 is made. It should be noted herein that the expression (9) is a relational expression in feedback control for making the d-axis voltage command Vd2* equal to 0. Incidentally, in the expression (9), "last Δθos2" in the first term of the right side is the last offset amount Δθos2, "s1" in the second term of the right side is a gain of a proportional term, and "s2" in the third term of the right side is a gain of an integral term. Incidentally, in the embodiment of the present disclosure, as indicated by the expression (9), proportional-plus-integral control is used to calculate the offset amount Δθos2 for making the d-axis voltage command Vd2* equal to 0. However, proportional control or proportional-plus-integral-plus-derivative control may be used instead.

$$\Delta\theta os2 = \text{last } \Delta\theta os2 + s1 \times (0 - Vd2^*) + s2 \times \int (0 - Vd2^*) dt \quad (9)$$

When the processing procedures of steps S170 to S220 are repeatedly carried out in this manner and the d-axis voltage command Vd2* falls within the predetermined voltage range in step S200, the offset amount Δθos2 at that time is set as the learning offset amount Δθlv2 (the learning offset amount Δθlv2 is updated), offset learning is completed by storing this learning offset amount Δθlv2 into the flash memory 40d (step S230), 0 is set as the learning flag F1 (step S240), 1 is set as the learning completion flag F2 (step S250), and the present routine is ended.

If it is determined in step 210 that an offset learning stop command has been received from the HVECU 70, offset learning is stopped, and the present routine is ended without setting the learning completion flag F2 to 1.

Next, the shift control routine of FIG. 9 will be described. This routine is repeatedly executed at intervals of a predetermined time (e.g., at intervals of several milliseconds) when the shift position SP is the drive position (the D position). When the shift control routine is executed, the HVECU 70 first causes data such as the accelerator opening degree Acc, the rotational speed Nm2 of the second motor MG2, the learning flag F1, the learning completion flag F2 and the like to be input thereto (step S300). It should be noted herein that a value detected by the accelerator pedal position sensor 84 is input as the accelerator opening degree Acc. A value computed based on the rotational position θm2 of the rotor of the second motor MG2 from the rotational position sensor 44 is input as the rotational speed Nm2 of the second motor MG2 through communication from the motor ECU 40. Values set by the offset learning control routine of FIG. 8 are input as the learning flag F1 and the learning completion flag F2 through communication from the motor ECU 40.

When data are thus input, the learning completion flag F2 is checked (step S310). Then, if the learning completion flag F2 is equal to 1, it is determined that offset learning has been completed, normal shift control is performed (step S320), and the present routine is ended. In performing normal shift control, the HVECU 70 sets a normal shift stage Gsno of the transmission 60 based on the accelerator opening degree Acc, the vehicle speed V and a shift map of FIG. 10, and controls the transmission 60 such that the shift stage Gs of the transmission 60 becomes the normal shift stage Gsno. In FIG. 10, each of "1-2", "2-3" and "3-4" lines as solid lines indicates an upshift line of the transmission 60, and each of "2-1", "3-2" and "4-3" lines as broken lines indicates a downshift line of the transmission 60.

If the learning completion flag F2 is equal to 0 in step S310, it is determined that offset learning has not been completed, and the value of the learning flag F1 is checked (step S330). Then, if the learning flag F1 is equal to 0, it is determined that offset learning is not being carried out (offset learning has not been started yet), and it is determined, based on the rotational speed Nm2 of the second motor MG2, whether or not the second motor MG2 is in rotation (step S340). This processing procedure is designed to determine whether or not offset learning may be carried out. This is because the d-axis voltage Vd2 (the d-axis voltage command Vd2*) is equal to 0 regardless of whether or not the present offset amount Δθos2 is an adequate value, when the rotational speed Nm2 (the angular velocity ωm2) of the second motor MG2 is equal to 0, as is apparent from the aforementioned expression (7).

If it is determined in step S340 that the second motor MG2 is not in rotation, it is determined that offset learning should not be carried out, learning shift control is performed (step S370) without transmitting an offset learning command to the motor ECU 40, and the present routine is ended.

If it is determined in step S340 that the second motor MG2 is in rotation, it is determined that offset learning may be carried out, and it is determined based on the accelerator opening degree Acc whether the accelerator is off or on (step S350). This processing procedure is designed to determine whether or not a driver may develop a feeling of strangeness (due to a difference between the torque command Tm2* and an output torque) when 0 is set as the d-axis current command Id2* and the q-axis current command Iq* as an act of carrying out offset learning.

If it is determined in step S350 that the accelerator is on, it is determined that the driver may develop a feeling of strangeness when 0 is set as each of the d-axis current command Id2* and the q-axis current command Iq* as the act of carrying out offset learning, learning shift control is performed (step S370) without transmitting an offset learning command to the motor ECU 40, and the present routine is ended. In this case, the driver can be kept from developing a feeling of strangeness, by refraining from carrying out offset learning.

If it is determined in step S350 that the accelerator is off, it is determined that the driver does not develop a feeling of strangeness even when 0 is set as each of the d-axis current command Id2* and the q-axis current command Iq* as the act of carrying out offset learning, an offset learning command is transmitted to the motor ECU 40 (step S360), learning shift control is performed (step S370), and the present routine is ended. Upon receiving the offset learning command, the motor ECU 40 carries out offset learning with the second motor MG2 in rotation, according to the offset learning routine of FIG. 8. Besides, in performing learning shift control, the HVECU 70 controls the transmission 60 such that the shift stage Gs of the transmission 60 becomes the learning shift stage Gslv, using the highest speed stage within the low vehicle speed-side predetermined shift stage range as the learning shift stage Gslv. In the embodiment of the present disclosure, in the four-stage transmission, the first speed stage and the second speed stage are confined within the predetermined shift stage range, and the second speed stage is adopted as a learning shift stage Gslv. In this manner, offset learning is carried out in carrying out learning shift control.

As described above, in offset learning, each of the d-axis current command Id2* and the q-axis current command Iq2* is made equal to 0, and the offset amount Δθos2 at the time when the d-axis voltage command Vd2* is within the predetermined voltage range is set (updated) as the learning offset amount Δθlv2. Besides, if each of the d-axis current command Id2* and the q-axis current Iq2* is made equal to 0 in the case where the present offset amount Δθos2 (the control rotational position θc2) is not an adequate value in carrying out offset learning, the d-axis voltage Vd2 is higher when the angular velocity ωm2 of the second motor MG2 is high than when the angular velocity ωm2 of the second motor MG2 is low, as is apparent from the aforementioned expression (7). Accordingly, when the rotational speed Nm2 (the angular velocity ωm2) of the second motor MG2 is low, the d-axis voltage Vd2 (the d-axis voltage command Vd2*) is low (the influence of an error is great), and the accuracy of the learning offset amount Δθlv2 may be low (a low-accuracy learning result may be reflected). In the embodiment of the present disclosure, in carrying out offset learning, learning shift control for controlling the transmission 60 such that the shift stage Gs of the transmission 60 falls within the low vehicle speed-side predetermined shift stage range is performed. Thus, in carrying out offset learning, offset learning can be carried out with the rotational speed Nin of the input shaft 61 of the transmission 60, namely, the rotational speed Nm2 of the second motor MG2 more reliably made high to a certain extent than in the case where normal shift control for controlling the transmission 60 such that the shift stage Gs of the transmission 60 becomes the normal shift stage Gsno based on the accelerator opening degree Acc and the vehicle speed V is performed. As a result, the accuracy of offset learning can be restrained from decreasing (a low-accuracy learning result can be restrained from being reflected).

Moreover, in performing learning shift control, the highest speed stage within the predetermined shift stage range is used as the learning shift stage Gslv. In the case where the accelerator is off, the required torque Tout* is closer to 0 while remaining negative when the shift stage Gs of the transmission 60 is high (the high vehicle speed-side shift stage) than when the shift stage Gs of the transmission 60 is low. Therefore, the torque command Tm2* of the second motor MG2 is also closer to 0 while remaining negative when the shift stage Gs of the transmission 60 is high (the high vehicle speed-side shift stage) than when the shift stage Gs of the transmission 60 is low. Besides, in carrying out offset learning, 0 is set as each of the d-axis current command Id2* and the q-axis current command Iq*. Therefore, in the case where the present offset amount $\Delta\theta os2$ is an adequate value, the absolute value of the output torque of the second motor MG2 is close to 0. Then, the likelihood of the driver developing a feeling of strangeness is considered to decrease as the difference between the torque command Tm2* of the second motor MG2 and the output torque decreases. As a result, the driver can be restrained more from developing a feeling of strangeness in carrying out offset learning, by using the highest speed stage within the predetermined shift stage range as the learning shift stage Gslv in performing learning shift control.

If the learning flag F1 is equal to 1 in step S330, it is determined that offset learning is being carried out. Then, as is the case with the processing procedures of steps S340 and S350, it is determined whether or not the second motor MG2 is in rotation (step S380), and it is determined whether the accelerator is off or on (step S390).

If it is determined in step S380 that the second motor MG2 is in rotation and it is determined in step S390 that the accelerator is off, the performance of learning shift control is continued (step S370), and the present routine is ended. Accordingly, the shift stage Gs of the transmission 60 is held equal to the learning shift stage Gslv (the second speed stage in the embodiment of the present disclosure). Thus, in carrying out offset learning, the rotational speed Nm2 (the angular velocity $\omega m2$) of the second motor MG2 can be kept from rapidly changing due to a change in the shift stage Gs of the transmission 60. As a result, the accuracy of offset learning can be kept from decreasing in carrying out offset learning.

If 1 is set as the learning completion flag F2 upon the completion of offset learning by the motor ECU 40 when the processing procedures of steps S300, S310, S330, S380, S390 and S370 are repeatedly carried out in this manner, it is determined in step S310 that the learning completion flag F2 is equal to 1, learning shift control is ended, normal shift control is performed (step S320), and the present routine is ended.

If it is determined in step S380 that the second motor MG2 is not in rotation, it is determined that offset learning cannot be appropriately carried out (it cannot be determined whether the present offset amount $\Delta\theta os2$ is an adequate value), an offset learning stop command is transmitted to the motor ECU 40 (step S400), learning shift control is stopped, normal shift control is performed (step S320), and the present routine is ended. Upon receiving the offset learning stop command, the motor ECU 40 can restrain the accuracy of offset learning from decreasing, by stopping offset learning.

If it is determined in step S390 that the accelerator is on, it is determined that the driver may develop a feeling of strangeness when 0 is set as each of the d-axis current command Id2* and the q-axis current command Iq* (the setting of 0 is continued) as the act of carrying out offset learning, an offset learning stop command is transmitted to the motor ECU 40 (step S400), learning shift control is stopped, normal shift control is performed (step S320), and the present routine is ended. At this time, the driver can be restrained from developing a feeling of strangeness, by stopping offset learning.

Figure 11:
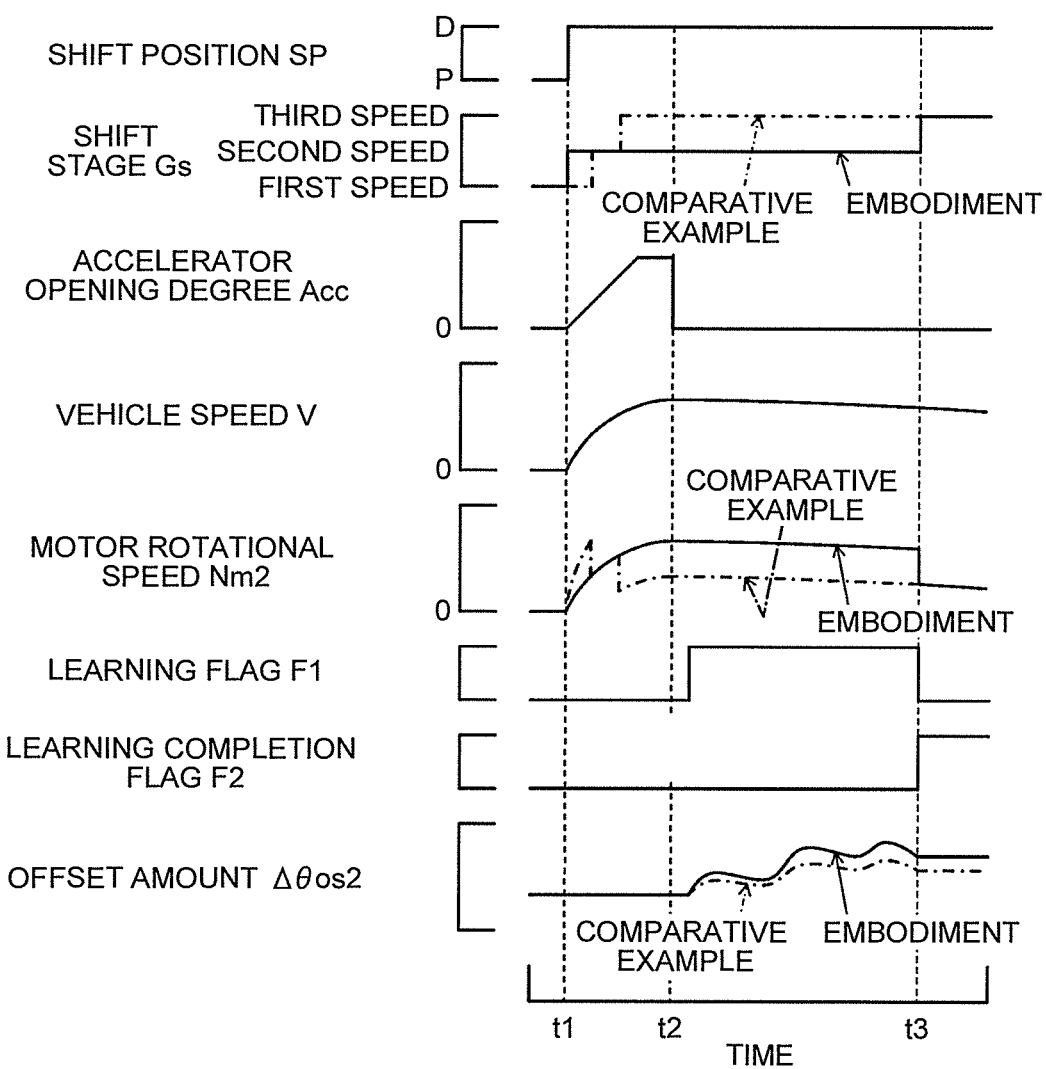
FIG. 11 is an illustrative view showing an example of how the motor ECU carries out offset learning.

FIG. 11 is an illustrative view showing an example of how offset learning is carried out. In the drawing, solid lines indicate the embodiment of the present disclosure, whereas alternate long and short dash lines indicate a comparative example, as to the shift stage Gs of the transmission 60, the rotational speed Nm2 of the second motor MG2 and the offset amount $\Delta\theta os2$. The shift stage Gs of the transmission 60, the rotational speed Nm2 of the second motor MG2, and the offset amount $\Delta\theta os2$ remain the same both in the embodiment of the present disclosure and in the comparative example. In the comparative example, as indicated by the alternate long and short dash lines in the drawing, when the hybrid automobile starts running in response to a change in the shift position SP from the P position to the D position at a time point t1, the shift stage Gs of the transmission 60 is shifted from the first speed stage to the second speed stage and then to the third speed stage as the vehicle speed V rises due to the turning on of the accelerator, as normal shift control. Then, when the accelerator is turned off at a time point t2, offset learning is carried out. Offset learning is completed at a time point t3. In this case, the accuracy of offset learning may decrease because the rotational speed Nm2 of the second motor MG2 is low. On the other hand, in the embodiment of the present disclosure, as indicated by the solid lines, the shift stage Gs of the transmission 60 is held equal to the second speed stage as learning shift control from the time point t1. Then, when the accelerator is turned off at the time point t2, offset learning is carried out while holding the shift stage Gs of the transmission 60 equal to the second speed stage. Offset learning is completed at the time point t3. Then, when offset learning is completed, learning shift control is ended to make a transition to normal shift control. As described hitherto, offset learning can be carried out with the rotational speed Nm2 of the second motor MG2 more reliably made high to a certain extent than in the case where offset learning is carried out while performing normal shift control, by carrying out offset learning in carrying out learning shift control. As a result, the accuracy of offset learning (the update of the learning offset amount $\Delta\theta lv2$) can be restrained from decreasing.

In the hybrid automobile 20 according to the embodiment of the present disclosure described above, with the second motor MG2 in rotation, 0 is set as each of the d-axis current command Id2* and the q-axis current command Iq2*, and offset learning is carried out. Then, in carrying out offset learning, learning shift control for controlling the transmission 60 such that the shift stage Gs of the transmission 60 falls within the low vehicle speed-side predetermined shift stage range is performed. Thus, offset learning can be carried out with the rotational speed Nm2 of the second motor MG2 more reliably made high to a certain extent than in the case where normal shift control is performed in carrying out offset learning. As a result, the accuracy of offset learning can be restrained from decreasing (a low-accuracy learning result can be restrained from being reflected).

Moreover, in carrying out offset learning, the transmission 60 is controlled such that the shift stage Gs of the transmission 60 is held equal to the learning shift stage Gslv within the predetermined shift stage range. Thus, the rotational speed Nm2 (the angular velocity ωm2) of the second motor MG2 can be kept from rapidly changing due to a change in the shift stage Gs of the transmission 60 in carrying out offset learning. As a result, the accuracy of offset learning can be kept from decreasing in carrying out offset learning.

Furthermore, in performing learning shift control, the highest speed stage within the predetermined shift stage range is used as the learning shift stage Gslv. Thus, the driver can be restrained more from developing a feeling of strangeness in carrying out offset learning, in the case where the required torque Tout* or hence the torque command Tm2* of the second motor MG2 is closer to zero while remaining negative when the shift stage Gs of the transmission 60 is high (the high vehicle speed-side shift stage) than when the shift stage Gs of the transmission 60 is low, with the accelerator off.

In the hybrid automobile 20 according to the embodiment of the present disclosure, in performing learning shift control, the highest speed stage within the low vehicle speed-side predetermined shift stage range (the second speed stage in the four-stage transmission) is used as the learning shift stage Gslv, and the transmission 60 is controlled such that the shift stage Gs of the transmission 60 is held equal to the learning shift stage Gslv. However, a shift stage other than the highest speed stage within the predetermined shift stage range (the first speed stage in the four-stage transmission) may be used as the learning shift stage Gslv. Besides, the learning shift stage Gslv may be set within the predetermined shift stage range in accordance with the vehicle speed V, the operation of a command switch (not shown) by the driver, or the like.

Figure 12:
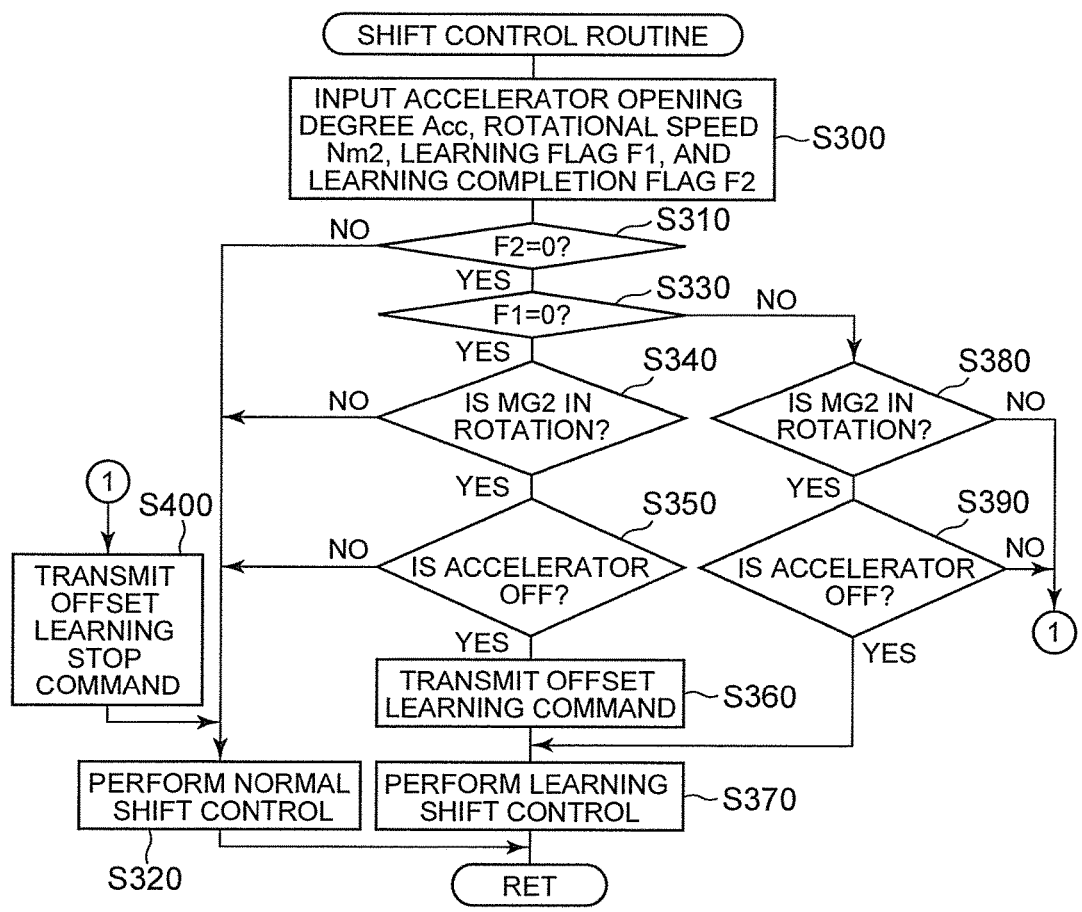
FIG. 12 is a flowchart showing an exemplary shift control routine according to a first modification example of shift control of the transmission.

In the hybrid automobile 20 according to the embodiment of the present disclosure, before the act of carrying out offset learning is started, learning shift control is performed regardless of whether or not the second motor MG2 is in rotation and whether the accelerator is off or on. However, as indicated by a shift control routine of a modification example of FIG. 12, if both the learning completion flag F2 and the learning flag F1 are equal to 0 in steps S310 and S330, namely, if the second motor MG2 is not in rotation in step S340 or if the accelerator is on in step S350 before the act of carrying out offset learning is started, normal shift control may be performed (step S320).

In the hybrid automobile 20 according to the embodiment of the present disclosure, when the second motor MG2 stops rotating or the accelerator is turned on in carrying out offset learning, offset learning is stopped, and learning shift control is stopped to make a transition to normal shift control. However, on these occasions, the performance of learning shift control may be continued although offset learning is stopped. In this case, the performance of learning shift control may be continued until offset learning is completed in the present trip.

In the hybrid automobile 20 according to the embodiment of the present disclosure, determinations are made on the start and stop of the act of carrying out offset learning and the performance of learning shift control, depending on whether or not the second motor MG2 is in rotation and whether the accelerator is off or on. However, determinations may be made on the start and stop of the act of carrying out offset learning and the performance of learning shift control, depending on whether or not the absolute value of the torque command Tm2* of the second motor MG2 is equal to or smaller than a threshold Tref, instead of whether the accelerator is off or on. It should be noted herein that the threshold Tref is a threshold that is used to determine whether or not the driver develops a feeling of strangeness (due to a difference between the torque command Tm2* and an output torque) when 0 is set as each of the d-axis current command Id2* and the q-axis current command Iq* as the act of carrying out offset learning. For example, several Nm or the like can be used as the threshold Tref. In this case, if the absolute value of the torque command Tm2* of the second motor MG2 is larger than the threshold Tref, it may be determined that the driver may develop a feeling of strangeness when 0 is set as each of the d-axis current command Id2* and the q-axis current command Iq*. If the absolute value of the torque command Tm2* of the second motor MG2 is equal to or smaller than the threshold Tref, it may be determined that the driver does not develop a feeling of strangeness even when 0 is set as each of the d-axis current command Id2* and the q-axis current command Iq*.

Figure 13:
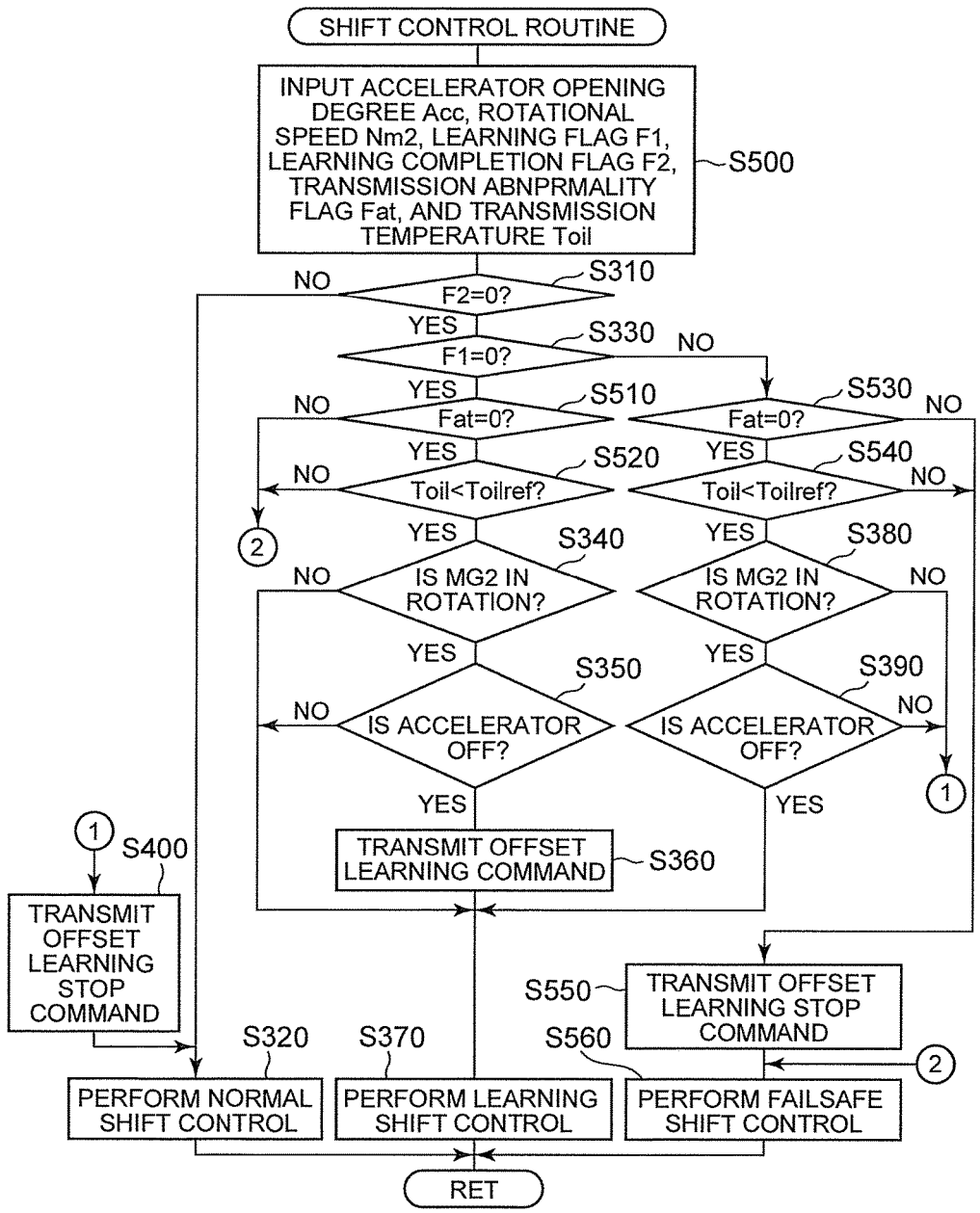
FIG. 13 is a flowchart showing an exemplary shift control routine according to a second modification example of the shift control.
Figure 14:
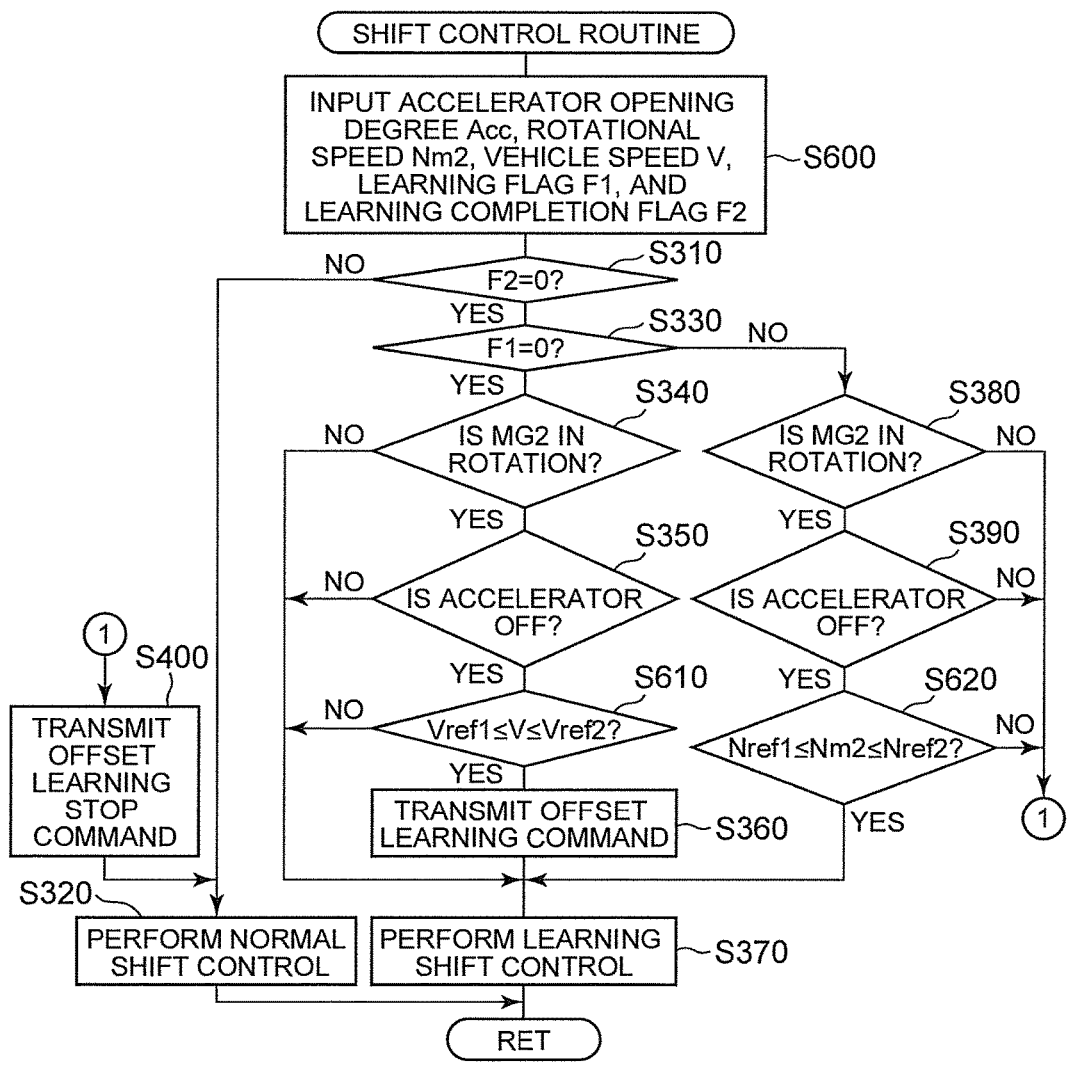
FIG. 14 is a flowchart showing an exemplary shift control routine according to a third modification example of the shift control.

In the hybrid automobile 20 according to the embodiment of the present disclosure, determinations are made on the start and stop of the act of carrying out offset learning and the performance of learning shift control, depending on whether or not the second motor MG2 is in rotation and whether the accelerator is off or on. However, in addition, determinations may be made on the start and stop of the act of carrying out offset learning and the performance of learning shift control, depending on at least one of whether or not there is an abnormality in the transmission 60, the temperature Toil of cooling oil for cooling the transmission 60, the vehicle speed V, the rotational speed Nm2 of the second motor MG2, and the like. FIG. 13 shows an exemplary shift control routine in the case where determinations are made depending on whether or not there is an abnormality in the transmission 60 and the temperature Toil of cooling oil for cooling the transmission 60. FIG. 14 shows an exemplary shift control routine in the case where determinations are made depending on the vehicle speed V and the rotational speed Nm2 of the second motor MG2. These routines will be sequentially described hereinafter. Incidentally, in the shift control routines of FIG. 13 and FIG. 14, in the same manner as described above, determinations may be made depending on whether the absolute value of the torque command Tm2* of the second motor MG2 is equal to or smaller than the threshold Tref instead of whether the accelerator is off or on.

The shift control routine of FIG. 13 is identical to the shift control routine of FIG. 9 except in that the processing procedure of step S500 is carried out instead of the processing procedure of step S100 and that the processing procedures of steps S510 to S560 are added. Accordingly, the same step numbers are allocated to the shift control routine of FIG. 13, and detailed description thereof will be omitted.

In the shift control routine of FIG. 13, as is the case with the processing procedure of step S100 in the shift control routine of FIG. 9, the HVECU 70 causes data such as a transmission abnormality flag Fat, the temperature Toil of cooling oil for cooling the transmission and the like as well as data such as the accelerator opening degree Acc, the rotational speed Nm2 of the second motor MG2, the learning flag F1, the learning completion flag F2 and the like to be input thereto (step S500). It should be noted herein that 0 is set as the input transmission abnormality flag Fat when there is no abnormality in the transmission 60, and that 1 is set as the input transmission abnormality flag Fat when there is an abnormality in the transmission 60. Incidentally, an abnormality in a plurality of frictional engagement elements, an abnormality in hydraulic actuators or the like can be mentioned as the abnormality in the transmission 60. A value detected by the temperature sensor 68 is input as the temperature Toil of cooling oil for cooling the transmission 60.

Subsequently, if both the learning completion flag F2 and the learning flag F1 are equal to 0 in steps S310 and S330, it is determined that the act of carrying out offset learning has not been started yet, the value of the transmission abnormality flag Fat is checked (step S510), and the temperature Toil of cooling oil for cooling the transmission 60 is compared with a threshold Toilref (step S520). It should be noted herein that the threshold Toilref is a threshold that is used to determine whether or not the transmission 60 is overheated. For example, 110° C., 120° C., 130° C. or the like can be used as the threshold Toilref. Then, if the transmission abnormality flag Fat is equal to 0 and the temperature Toil of cooling oil for cooling the transmission 60 is lower than the threshold Toilref, it is determined that there is no abnormality in the transmission 60 and that the transmission 60 is not overheated, and the processing procedures starting from step S340 are carried out.

If the transmission abnormality flag Fat is equal to 1 in step S510 or if the temperature Toil of cooling oil for cooling the transmission 60 is equal to or higher than the threshold Toilref in step S520, it is determined that there is an abnormality in the transmission 60 or that the transmission 60 is overheated, failsafe shift control is performed (step S560) without transmitting an offset learning command to the motor ECU 40, and the present routine is ended. In performing failsafe shift control, for example, shifting is carried out exclusively to a formable fixed stage or within a range determined in advance. The degree of abnormality or overheat of the transmission 60 can be restrained from increasing, by performing failsafe shift control in this manner. Besides, the accuracy of offset learning can be kept from decreasing, by refraining from carrying out offset learning.

If the learning flag F1 is equal to 1 in step S330, it is determined that offset learning is being carried out. Then, as is the case with the processing procedures of steps S510 and S520, the value of the transmission abnormality flag Fat is checked (step S530), and the temperature Toil of cooling oil for cooling the transmission 60 is compared with the threshold Toilref (step S540). Then, if the transmission abnormality flag Fat is equal to 0 and the temperature Toil of cooling oil for cooling the transmission 60 is lower than the threshold Toilref, it is determined that there is no abnormality in the transmission 60 and that the transmission 60 is not overheated, and the processing procedures starting from step S380 are carried out.

If the transmission abnormality flag Fat is equal to 1 in step S530 or if the temperature Toil of cooling oil for cooling the transmission 60 is equal to or higher than the threshold Toilref in step S540, it is determined that there is an abnormality in the transmission 60 in carrying out offset learning, or that the transmission 60 is overheated in carrying out offset learning. Then, an offset learning stop command is transmitted to the motor ECU 40 (step S550), failsafe shift control is performed (step S560), and the present routine is ended. The degree of abnormality or overheat of the transmission 60 can be restrained from increasing, by performing failsafe shift control in this manner. Besides, the accuracy of offset learning can be kept from decreasing, by stopping offset learning.

The shift control routine of FIG. 14 is identical to the shift control routine of FIG. 9 except in that the processing procedure of step S600 is carried out instead of the processing procedure of step S100 and that the processing procedures of steps S610 and S620 are added. Accordingly, the same step numbers are allocated to the shift control routine of FIG. 14, and detailed description thereof will be omitted.

In the shift control routine of FIG. 14, as is the case with the processing procedure of step S100 in the shift control routine of FIG. 9, the HVECU 70 causes data such as the vehicle speed V and the like as well as data such as the accelerator opening degree Acc, the rotational speed Nm2 of the second motor MG2, the learning flag F1, the learning completion flag F2 and the like to be input thereto (step S600). It should be noted herein that a value detected by the vehicle speed sensor 88 is input as the vehicle speed V.

Subsequently, if both the learning completion flag F2 and the learning flag F1 are equal to 0 in steps S310 and S330, it is determined that the act of carrying out offset learning has not been started yet. Then, if the second motor MG2 is in rotation in step S340 and the accelerator is off in step S350, the vehicle speed V is compared with a threshold Vref1 and a threshold Vref2 (step S610).

It should be noted herein that the threshold Vref1 and the threshold Vref2 are determined as vehicle speeds corresponding to a threshold Nref1 and a threshold Nref2 at the time when learning shift control is performed (when the shift stage Gs of the transmission 60 is held equal to the second speed stage) respectively. It should be noted herein that the threshold Nref1 and the threshold Nref2 are determined as a lower limit and an upper limit of a rotational speed range of the second motor MG2 where offset learning can be carried out with sufficiently high accuracy in carrying out learning shift control, respectively. For example, 2500 rpm, 3000 rpm, 3500 rpm or the like can be used as the threshold Nref1. For example, 5500 rpm, 6000 rpm, 6500 rpm or the like can be used as the threshold Nref2. For example, 25 km/h, 30 km/h, 35 km/h or the like can be used as the threshold Vref1. For example, 55 km/h, 60 km/h, 65 km/h or the like can be used as the threshold Vref2. Incidentally, if the vehicle speed V is lower than the threshold Vref1 (if the rotational speed Nm2 of the second motor MG2 becomes lower than the threshold Nref1 when learning shift control is performed), it may be impossible to carry out offset learning with sufficiently high accuracy, for the reason that the d-axis voltage Vd2 (the d-axis voltage command Vd2*) is unlikely to become high (the influence of an error is likely to become great) if each of the d-axis current command Id2* and the q-axis current command Iq2* is made equal to 0 in the case where the offset amount Δθos2 is not an adequate value in carrying out offset learning in carrying out learning shift control. Besides, if the vehicle speed V is higher than the threshold Vref2 (if the rotational speed Nm2 of the second motor MG2 becomes higher than the threshold Nref2 when learning shift control is performed), it may be impossible to carry out offset learning with sufficiently high accuracy due to a detection delay and the like of the rotational position sensor 44 and the current sensors 46v and 46w Incidentally, the hybrid automobile can be considered to be running down a slope if the vehicle speed V is higher than the threshold Vref2 when the accelerator is off.

If the vehicle speed V is lower than the threshold Vref1 or higher than the threshold Vref2 in step S610, it is determined that the act of carrying out offset learning with sufficiently high accuracy in carrying out learning shift control may be impossible. Then, learning shift control is performed (step S370) without transmitting an offset learning command to the motor ECU 40, and the present routine is ended.

If the vehicle speed V is equal to or higher than the threshold Vref1 and equal to or lower than the threshold Vref2 in step S610, an offset learning command is transmitted to the motor ECU 40 (step S360), learning shift control is performed (step S370), and the present routine is ended. Thus, offset learning can be carried out with sufficiently high accuracy.

If the learning flag F1 is equal to 1 in step S330, it is determined that offset learning is being carried out. Then, if the second motor MG2 is in rotation in step S380 and the accelerator is off in step S390, the rotational speed Nm2 of the second motor MG2 is compared with the threshold Nref1 and the threshold Nref2 (step S620). Incidentally, instead of the processing procedure of step S620, the vehicle speed V may be compared with the threshold Vref1 and the threshold Vref2, as is the case with the processing procedure of step S610.

If the rotational speed Nm2 of the second motor MG2 is equal to or higher than the threshold Nref1 and equal to or lower than the threshold Nref2 (if the vehicle speed V is equal to or higher than the threshold Vref1 and equal to or lower than the threshold Vref2) in step S620, learning shift control is performed (step S370), and the present routine is ended.

If the rotational speed Nm2 of the second motor MG2 becomes lower than the threshold Nref1 or higher than the threshold Nref2 (if the vehicle speed V becomes lower than the threshold Vref1 or higher than the threshold Vref2) in step S620, it is determined that the act of carrying out offset learning with sufficiently high accuracy in carrying out learning shift control may be impossible. Then, an offset learning stop command is transmitted to the motor ECU 40 (step S400), learning shift control is stopped, normal shift control is performed (step S320), and the present routine is ended. The accuracy of offset learning can be restrained more from decreasing, by stopping offset learning in this manner.

In this modification example, learning shift control is performed before starting to carry out offset learning, regardless of whether or not the vehicle speed V is equal to or higher than the threshold Vref1 and equal to or lower than the threshold Vref2. However, when the vehicle speed V is lower than the threshold Vref1 or higher than the threshold Vref2, normal shift control may be performed.

Besides, in this modification example, when the rotational speed Nm2 of the second motor MG2 becomes lower than the threshold Nref1 or higher than the threshold Nref2 in carrying out offset learning, offset learning is stopped, and learning shift control is stopped to make a transition to normal shift control. However, on these occasions, the performance of learning shift control may be continued although offset learning is stopped. In this case, the performance of learning shift control may be continued until offset learning is completed in the present trip.

Furthermore, in this modification example, the threshold Nref2 and the threshold Vref2 are the upper limit of the rotational speed range of the second motor MG2 in which offset learning can be carried out with sufficiently high accuracy in carrying out learning shift control, and the vehicle speed V corresponding thereto, respectively. However, in the case where the second inverter 42 is controlled through pulse width modulation (PWM) control in a region where the rotational speed Nm2 of the second motor MG2 is equal to or lower than a threshold Nref3 and the second inverter 42 is controlled according to a rectangular wave control method in a region where the rotational speed Nm2 of the second motor MG2 is higher than the threshold Nref3, the threshold Nref2 and the threshold Vref2 may be this threshold Nref3 and the vehicle speed V corresponding thereto, respectively. In this case, offset learning can be kept from being carried out in the region of rectangular wave control, by stopping offset learning and learning shift control when the rotational speed Nm2 of the second motor MG2 becomes higher than the threshold Nref2 (=Nref3) in carrying out offset learning. Thus, the controllability of the second motor MG2 can be restrained from decreasing.

In addition, according to this modification example, the threshold Nref2 and the threshold Vref2 are the upper limit of the rotational speed range of the second motor MG2 in which offset learning can be carried out with sufficiently high accuracy in carrying out learning shift control, and the vehicle speed V corresponding thereto, respectively. However, the threshold Nref2 and the threshold Vref2 may be a rotational speed slightly lower than an upper-limit rotational speed at which the driver does not feel a shift shock even when the shift stage is changed immediately after the end of learning shift control upon completion of offset learning, and the vehicle speed V corresponding thereto, respectively. In this case, the driver can be restrained from feeling a shift shock after the completion of offset learning, by stopping offset learning and learning shift control when the rotational speed Nm2 of the second motor MG2 becomes higher than the threshold Nref2 in carrying out offset learning.

Figure 15:
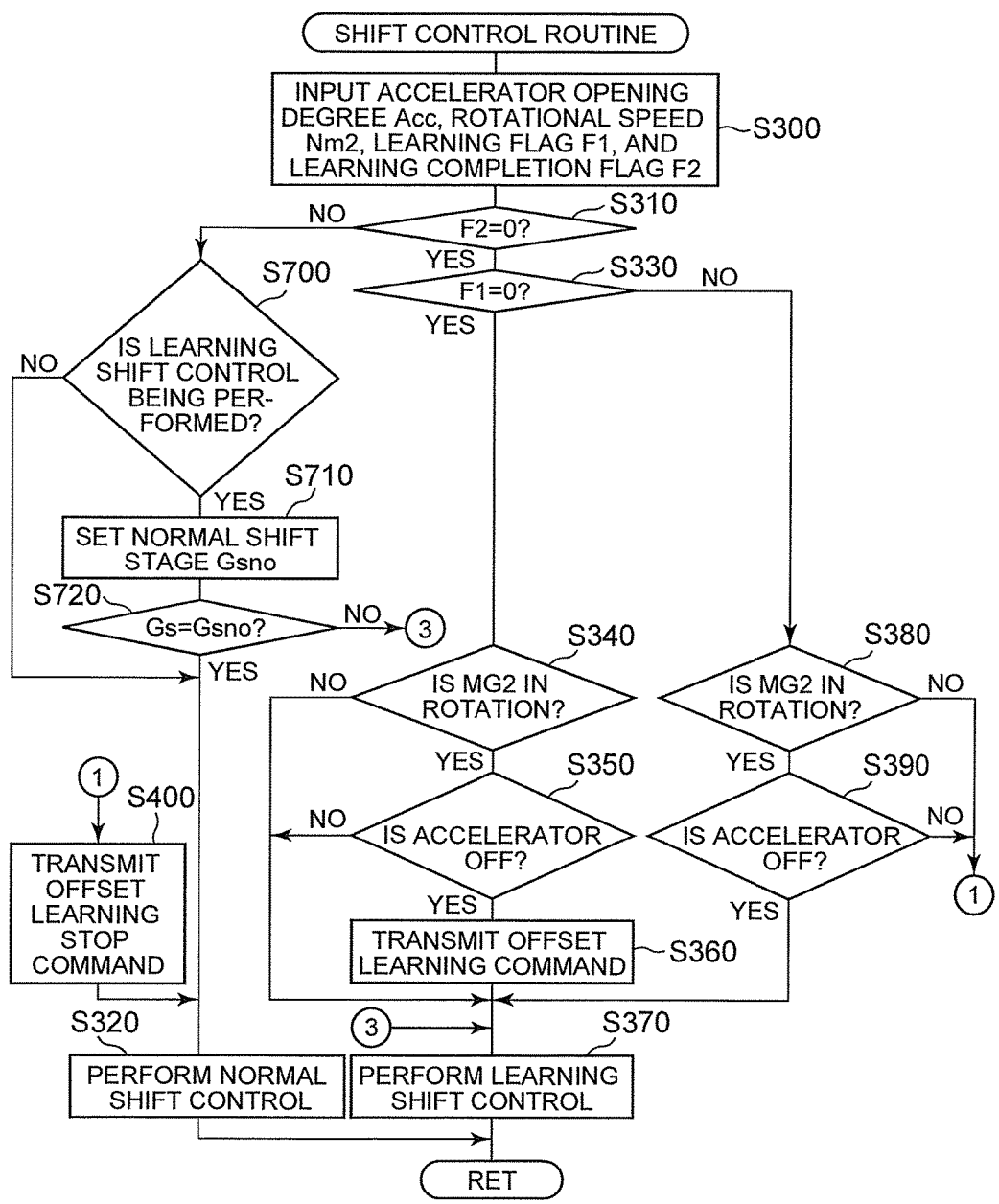
FIG. 15 is a flowchart showing an exemplary shift control routine according to a fourth modification example of the shift control.

In the hybrid automobile 20 according to the embodiment of the present disclosure, when offset learning is completed, a transition from learning shift control to normal shift control is immediately made. However, a transition from learning shift control to normal shift control may be made when a predetermined condition is fulfilled after the completion of offset learning. FIG. 15 shows an exemplary shift control routine in this case. The shift control routine of FIG. 15 is identical to the shift control routine of FIG. 9 except in that the processing procedures of steps S700 to S720 are added. Accordingly, the same step numbers are allocated to the shift control routine of FIG. 15, and detailed description thereof will be omitted.

In the shift control routine of FIG. 15, if it is determined in step S310 that the learning completion flag F2 is equal to 1, the HVECU 70 determines whether or not learning shift control is being performed (step S700). Then, if it is determined that learning shift control is being performed, the normal shift stage Gsno that is used in normal shift control is set (step S710). The method of setting the normal shift stage Gsno has been described above.

Subsequently, it is determined whether or not the present shift stage Gs (the learning control shift stage Gslv) of the transmission 60 is equal to the normal shift stage Gsno (step S720). If it is determined that the present shift stage Gs of the transmission 60 is not equal to the normal shift stage Gsno, learning shift control is performed (the performance thereof is continued) (step S370), and the present routine is ended.

If it is determined in step S720 that the present shift stage Gs of the transmission 60 is equal to the normal shift stage Gsno, normal shift control is performed, namely, a transition from learning shift control to normal shift control is made (step S320), and the present routine is ended. Thus, the driver can be kept from developing a feeling of strangeness due to a change in the shift stage of the transmission immediately after the completion of offset learning.

In the hybrid automobile 20 according to the embodiment of the present disclosure, offset learning is carried out once in a single trip. However, offset learning may be carried out a plurality of times in a single trip. Besides, offset learning may be carried out once in a plurality of trips (e.g., two trips or three trips).

In the hybrid automobile 20 according to the embodiment of the present disclosure, the temperature Toil of cooling oil for cooling the transmission 60 is used as the temperature of the transmission 60. However, the temperature of the transmission 60 itself may be used.

In the hybrid automobile 20 according to the embodiment of the present disclosure, the control in carrying out offset learning in a trip after the shipment of the hybrid automobile from the factory or the replacement of a part thereof (a trip in which the driver drives the automobile to cause it to run) has been described. However, the maintenance mode may be established in the vehicle at the time of the shipment thereof from the factory or the replacement of a part thereof, and the offset learning control routine that is executed by the offset learning control unit 97 of the motor ECU 40 in FIG. 8 or the shift control routine that is executed by the HVECU 70 in FIG. 9 may be executed as is the case with the embodiment of the present disclosure.

The hybrid automobile 20 according to the embodiment of the present disclosure is equipped with the motor ECU 40 and the HVECU 70. However, the motor ECU 40 and the HVECU 70 may be configured as a single electronic control unit.

In the hybrid automobile 20 according to the embodiment of the present disclosure, the four-stage transmission is employed as the transmission 60. However, a two-stage transmission, a three-stage transmission, a five-stage transmission, a six-stage transmission, an eight-stage transmission, a ten-stage transmission or the like may be employed as the transmission. On these occasions, the low vehicle speed-side predetermined shift stage range may be, for example, a range from the first speed stage to any one of the second speed stage, the third speed stage and the fourth speed stage in the six-stage transmission, or a range from the first speed stage to any one of the second speed stage, the third speed stage, the fourth speed stage and the fifth speed stage in the eight-stage transmission.

Figure 16:
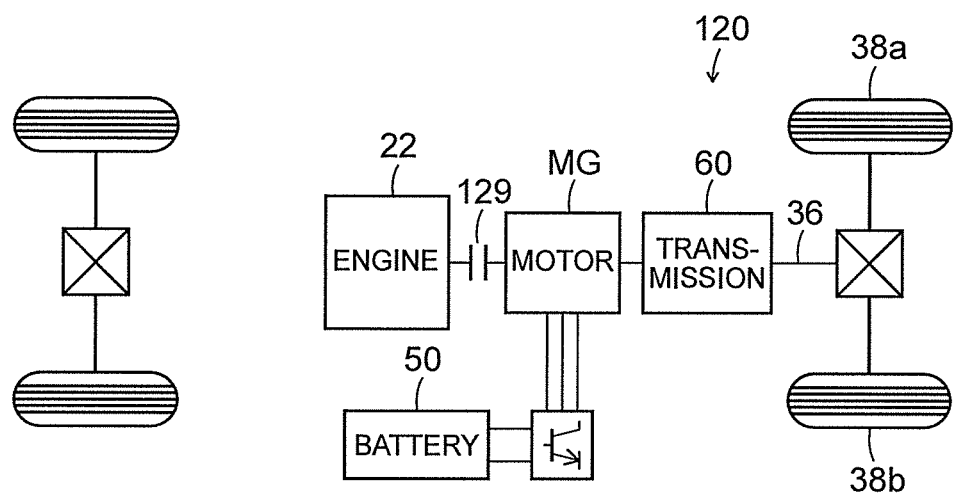
FIG. 16 is a block diagram showing the outline of the configuration of a hybrid automobile as a first modification example of the hybrid automobile.
Figure 17:
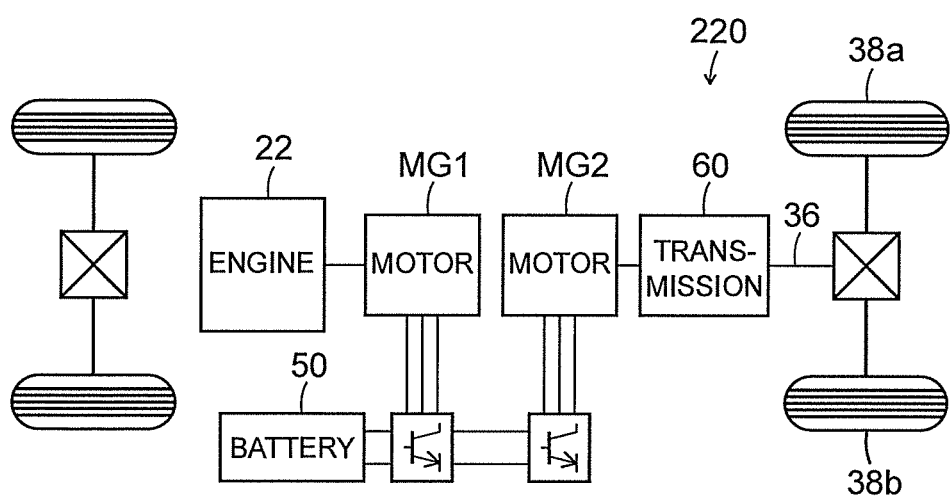
FIG. 17 is a block diagram showing the outline of the configuration of a hybrid automobile as a second modification example of the hybrid automobile.
Figure 18:
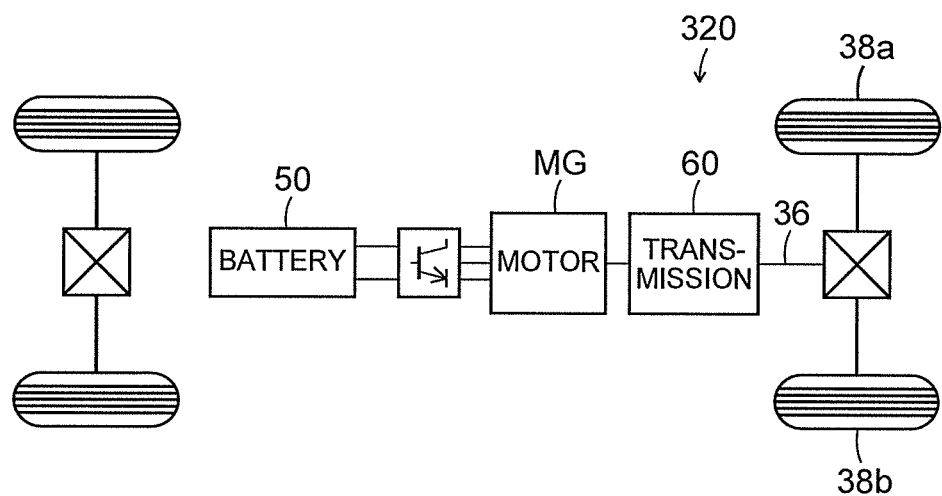
FIG. 18 is a block diagram showing the outline of the configuration of a hybrid automobile as a third modification example of the hybrid automobile.

The hybrid automobile 20 according to the embodiment of the present disclosure is configured such that the engine 22 and the first motor MG1 are connected to the drive shaft 36, which is coupled to the driving wheels 38*a* and 38*b*, via the planetary gear set 30, and that the second motor MG2 is connected to the drive shaft 36. However, as indicated by a modification example of FIG. 16, a hybrid automobile 120 may be configured such that a motor MG is connected to the drive shaft 36, which is coupled to the driving wheels 38*a* and 38*b*, via the transmission 60, and that the engine 22 is connected to a rotary shaft of the motor MG via a clutch 129. Besides, as indicated by a modification example of FIG. 17, a hybrid automobile 220 may be configured as a so-called series hybrid automobile in which the motor MG1 for electric power generation is connected to an output shaft of the engine 22, and the second motor MG2 for running is connected to the drive shaft 36, which is coupled to the driving wheels 38*a* and 38*b*, via the transmission 60. Furthermore, as indicated by a modification example of FIG. 18, an electric automobile 320 may be configured as an electric automobile in which the motor MG for running is connected to the drive shaft 36, which is coupled to the driving wheels 38*a* and 38*b*, via the transmission 60. That is, the automobile may adopt any configuration as long as a motor is connected to a drive shaft, which is coupled to driving wheels, via a transmission.

A corresponding relationship between the main elements of the embodiment of the present disclosure and the main elements of the present disclosure mentioned in the section of the summary will be described. In the embodiment of the present disclosure, the second motor MG2 is an example of "the three-phase motor" of the present disclosure. The second inverter 42 is an example of "the inverter" of the present disclosure. The transmission 60 is an example of "the transmission" of the present disclosure. The motor ECU 40 is an example of "the inverter control device" of the present disclosure. The rotational position sensor 44 is an example of "the rotational position sensor" of the present disclosure. The offset learning control unit 97 of the motor ECU 40 is an example of "the offset learning device" of the present disclosure. The adder 98 is an example of "the rotational position correction device" of the present disclosure. The HVECU 70 is an example of "the transmission control device" of the present disclosure.

Incidentally, the corresponding relationship between the main elements of the embodiment of the present disclosure and the main elements of the present disclosure mentioned in the section of the summary is an example for concretely explaining the mode for carrying out the present disclosure described in the section of the summary according to the embodiment of the present disclosure, and therefore does not limit the elements of the present disclosure mentioned in the section of the summary. That is, the present disclosure described in the section of the summary should be construed based on the description in the section, and the embodiment of the present disclosure is nothing more than a concrete example of the present disclosure described in the section of the summary.

Although the mode for carrying out the present disclosure has been described above through the use of the embodiment thereof, it is obvious that the present disclosure is not limited at all to this embodiment thereof but can be carried out in various modes within such a range as not to depart from the gist thereof.

The present disclosure is available in the automobile manufacturing industry and the like.

What is claimed is:

1. An automobile comprising:
   a three-phase motor;
   an inverter configured to drive the three-phase motor;
   a transmission configured to transmit motive power while changing a shift stage between a rotary shaft of the three-phase motor and a drive shaft that is coupled to an axle of the automobile;
   a rotational position sensor configured to detect a rotational position of the three-phase motor; and
   an electronic control unit configured to:
   (i) set a d-axis current command and a q-axis current command based on a torque command of the three-phase motor,
   (ii) convert respective phase currents of the three-phase motor into a d-axis current and a q-axis current based on the rotational position of the three-phase motor,
   (iii) set a d-axis voltage command and a q-axis voltage command based on the d-axis current command, the d-axis current, the q-axis current command, and the q-axis current,
   (iv) convert the d-axis voltage command and the q-axis voltage command into respective phase voltage commands of the three-phase motor based on the rotational position of the three-phase motor,
   (v) control the inverter based on the respective phase voltage commands,
   (vi) learn an offset amount of the rotational position sensor,
   (vii) correct the rotational position detected by the rotational position sensor based on a learned offset amount, (viii) carry out offset learning that makes the d-axis current command and the q-axis current command equal to 0 with the three-phase motor in rotation, and learns the offset amount of the rotational position such that the d-axis voltage command based on the d-axis current command and the q-axis current command becomes equal to 0, and (ix) carry out learning shift control that controls the transmission such that the shift stage of the transmission falls within a low vehicle speed-side predetermined shift stage range, while carrying out the offset learning.

2. The automobile according to claim 1, wherein the electronic control unit is configured to control the transmission such that the shift stage of the transmission is held equal to a predetermined shift stage within the predetermined shift stage range, in carrying out the learning shift control.

3. The automobile according to claim 2, wherein the predetermined shift stage is a highest speed stage within the predetermined shift stage range.

4. The automobile according to claim 1, wherein the electronic control unit is configured to stop the learning shift control and to carry out predetermined failsafe shift control when an abnormality occurs in the transmission or a temperature of the transmission becomes equal to or higher than a predetermined temperature, in carrying out the learning shift control.

5. The automobile according to claim 1, wherein the electronic control unit is configured to stop the offset learning when an abnormality occurs in the transmission or a temperature of the transmission becomes equal to or higher than a predetermined temperature, in carrying out the offset learning.

6. The automobile according to claim 1, wherein the electronic control unit is configured to stop the offset learning when a rotational speed of the three-phase motor falls outside a predetermined rotational speed range, in carrying out the offset learning.

7. The automobile according to claim 1, wherein the electronic control unit is configured to:

(i) end the learning shift control when a present shift stage coincides with a normal shift stage based on an accelerator operation amount and a vehicle speed of the automobile, after the offset learning is completed in carrying out the learning shift control, and (ii) carry out normal shift control that controls the transmission such that the shift stage of the transmission becomes the normal shift stage, after ending the learning shift control.

* * * * *